US 11,597,213 B2

(12) United States Patent
Hada

(10) Patent No.: US 11,597,213 B2
(45) Date of Patent: Mar. 7, 2023

(54) LIQUID JETTING APPARATUS AND JETTING CONTROL METHOD

(71) Applicant: Atsushi Hada, Kanagawa (JP)

(72) Inventor: Atsushi Hada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 90 days.

(21) Appl. No.: 17/204,164

(22) Filed: Mar. 17, 2021

(65) Prior Publication Data
US 2021/0291569 A1 Sep. 23, 2021

(30) Foreign Application Priority Data

Mar. 18, 2020 (JP) .............................. JP2020-048478

(51) Int. Cl.
B41J 2/21 (2006.01)
B41J 2/14 (2006.01)
B41J 25/00 (2006.01)

(52) U.S. Cl.
CPC ........... B41J 2/2132 (2013.01); B41J 2/1433 (2013.01); B41J 25/006 (2013.01)

(58) Field of Classification Search
CPC ............................. B41J 2/2132; B41J 2/1433
See application file for complete search history.

(56) References Cited

U.S. PATENT DOCUMENTS

| 7,506,946 B2 | 3/2009 | Tsuboi et al. |
| 8,770,693 B2 | 7/2014 | Tanaka et al. |
| 2003/0063153 A1* | 4/2003 | Bauer ................. B41J 11/42 347/40 |
| 2009/0179935 A1 | 7/2009 | Otokita |
| 2009/0179936 A1 | 7/2009 | Otokita |
| 2020/0171817 A1 | 6/2020 | Hada |
| 2020/0171837 A1 | 6/2020 | Tsuchiya |

FOREIGN PATENT DOCUMENTS

| JP | 2007-176112 | 7/2007 | |
| JP | 2011-173406 | 9/2011 | |
| JP | 2011173406 A * | 9/2011 | ............ B41J 2/2132 |
| JP | 2012-045927 | 3/2012 | |
| JP | 5262603 | 8/2013 | |
| JP | 5262604 | 8/2013 | |
| JP | 2020-082708 | 6/2020 | |

* cited by examiner

Primary Examiner — Jason S Uhlenhake
(74) Attorney, Agent, or Firm — IPUSA, PLLC

(57) ABSTRACT

A liquid jetting apparatus includes a recording head unit including nozzles; a moving mechanism configured to alternately perform a scanning operation of moving the recording head unit in a scanning direction while causing the recording head unit to discharge a liquid and a sub-scanning movement operation of moving the recording head unit or the recording medium in a sub-scanning direction without causing the recording head unit to discharge the liquid; a gradation setting unit configured to set gradation on portions of image data corresponding to setting regions at ends of the recording head unit; an irregular pattern setting unit configured to set an irregular pattern on the image data to randomize a dot ratio indicating the number of dots per unit area; and a head discharge drive unit configured to cause the nozzles to discharge the liquid based on the image data.

13 Claims, 21 Drawing Sheets

GRADATION CURVE: LINEAR SHAPE (30%–70%)

DISTRIBUTION OF DOT RATIO

GRADATION CURVE: S SHAPE (30%–70%)

DISTRIBUTION OF DOT RATIO

GRADATION CURVE: ARC SHAPE

0%  100%

DISTRIBUTION OF DOT RATIO

DOT SHAPE

GRAY BLACK GRAY
(DARK)    (LIGHT)

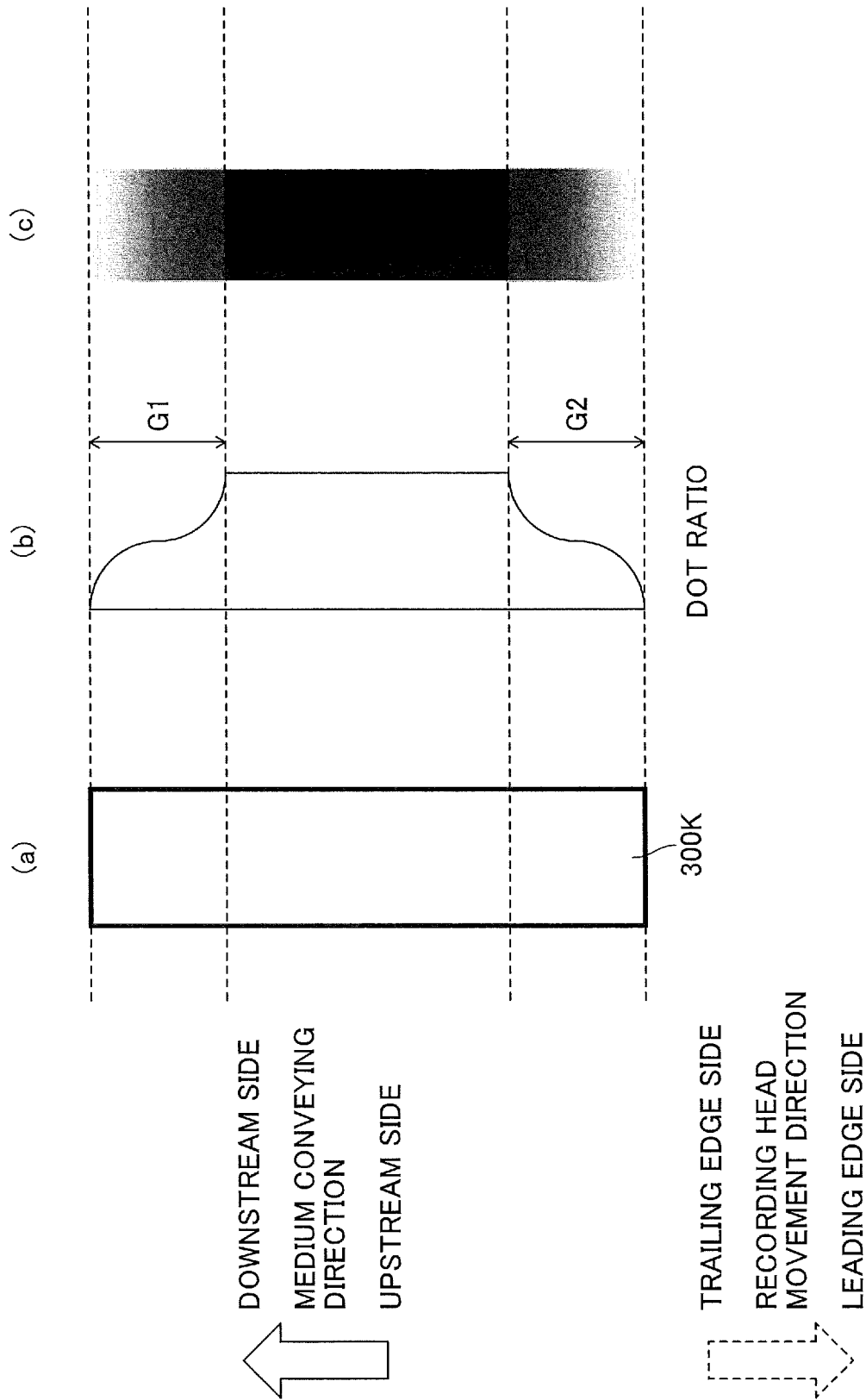

us 11,597,213 B2

LIQUID JETTING APPARATUS AND JETTING CONTROL METHOD

CROSS-REFERENCE TO RELATED APPLICATION

The present application claims priority under 35 U.S.C. § 119 to Japanese Patent Application No. 2020-048478, filed on Mar. 18, 2020, the contents of which are incorporated herein by reference in their entirety.

BACKGROUND OF THE INVENTION

1. Field of the Invention

An aspect of this disclosure relates to a liquid jetting apparatus and a jetting control method.

2. Description of the Related Art

There is a known inkjet recording apparatus that forms an image by jetting ink onto a recording medium while moving a recording head in which multiple nozzles for jetting ink are arranged and the recording medium relative to each other.

When bidirectional printing is performed in such an inkjet recording apparatus, the surface shape of ink in a region where the forward pass comes first becomes different from the surface shape of ink in a region where the backward pass comes first due to the difference in the order in which dot colors are layered and as a result, a boundary is formed between the regions. Such a boundary is generated in a band shape along the scanning direction of the head and banding, which indicates gloss unevenness, occurs in a recorded image.

The gloss banding has a trade-off relationship with productivity. When productivity is increased, gloss banding occurs and the image quality is lowered. There is a technology called "gradation mask" that makes it possible to obtain a high-quality image without density unevenness and gloss banding while increasing productivity.

For example, Japanese Unexamined Patent Publication No. 2011-173406 proposes applying symmetric gradation curves to the ends of a head as illustrated in FIGS. 1A through 1C. For example, FIG. 1A illustrates gradation curves 66 and 67 having a linear shape, FIG. 1B illustrates gradation curves 68 and 69 having an S-shape, and FIG. 1C illustrates gradation curves 70 and 71 having an arc shape.

SUMMARY OF THE INVENTION

According to an aspect of this disclosure, there is provided a liquid jetting apparatus that includes a recording head unit including a nozzle array formed of multiple nozzles that are arranged in a sub-scanning direction and configured to discharge a liquid toward a recording medium; a moving mechanism configured to alternately perform a scanning operation of moving the recording head unit relative to the recording medium in a scanning direction orthogonal to the sub-scanning direction while causing the recording head unit to discharge the liquid toward the recording medium, and a sub-scanning movement operation of moving one of the recording head unit and the recording medium relative to another one of the recording head unit and the recording medium in the sub-scanning direction without causing the recording head unit to discharge the liquid; a gradation setting unit configured to set gradation on portions of image data corresponding to setting regions at ends of the recording head unit in the sub-scanning direction such that the number of dots discharged from the nozzles decreases toward the ends; an irregular pattern setting unit configured to set an irregular pattern on the image data to randomize a dot ratio indicating the number of dots per unit area; and a head discharge drive unit configured to cause the nozzles of the recording head unit to discharge the liquid during the scanning operation based on the image data on which the gradation and the irregular pattern are set.

BRIEF DESCRIPTION OF THE DRAWINGS

FIG. 10 is a drawing illustrating a head, a dot ratio, and gradation according to a comparative example;

DESCRIPTION OF THE EMBODIMENTS

An aspect of this disclosure provides a liquid jetting apparatus that can suppress density unevenness and gloss banding in a landing region on a recording medium and reduce granularity even in a highly-productive imaging mode.

Embodiments of the present invention are described below with reference to the accompanying drawings. Throughout the accompanying drawings, the same reference number is assigned to the same component, and repeated descriptions of the component may be omitted.

<Overall Configuration>

First, an overall configuration of an image forming apparatus of an embodiment, which is an example of a liquid jetting apparatus, is described.

Figure 1A:
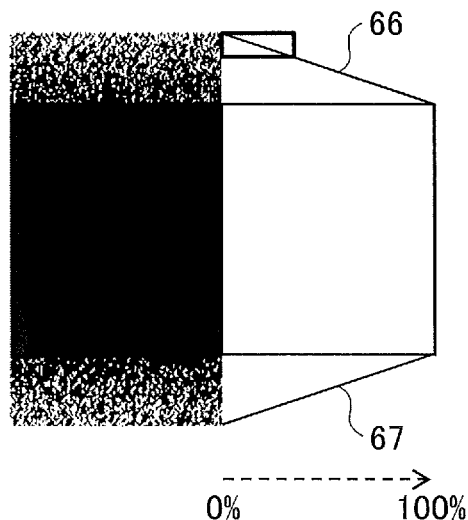
FIGS. 1A through 1C are drawings illustrating gradation curves of gradation masks according to the related art.
Figure 1B:
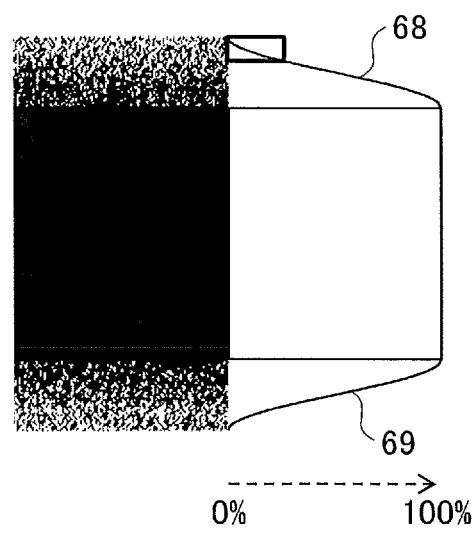
Figure 1C:
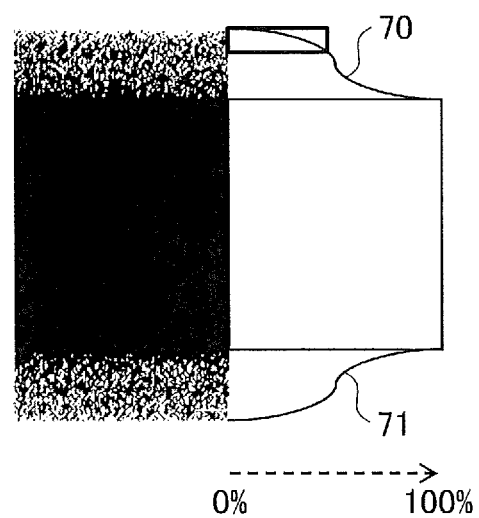
Figure 2:
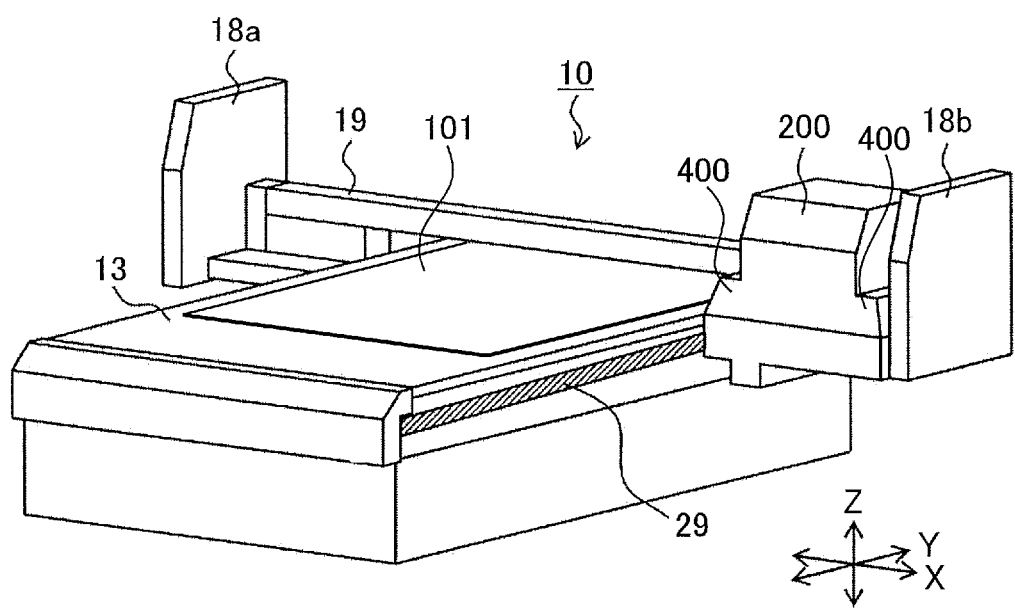
FIG. 2 is a perspective view an image forming apparatus according to an embodiment.

FIG. 2 is a perspective view of an inkjet recording apparatus that is an image forming apparatus according to an embodiment.

An inkjet recording apparatus 10 includes a carriage 200 and a stage 13 on which a recording medium is placed. The carriage 200 includes a head unit 300 that is an inkjet image forming unit including multiple liquid jet heads with multiple nozzles. The carriage 200 forms an image by jetting a liquid from nozzles N (see FIG. 11) of recording heads (recording head unit). The nozzles are formed on a surface of each recording head facing the stage 13. In the present embodiment, an ultraviolet curable ink is used as an example of the liquid.

Also, an irradiation unit 400, which is a light source for emitting ultraviolet light, is provided on a surface of the carriage 200 facing the stage 13. The irradiation unit 400 (an example of an irradiator) emits light with a wavelength that cures the liquid jetted from the nozzles N.

A guide rod 19 is provided to connect side plates 18a and 18b, and the guide rod 19 supports the carriage 200 such that the carriage 200 is movable in an X direction (a main-scanning direction).

Also, the carriage 200, the guide rod 19, and the side plates 18a and 18b can be moved together in a Y direction (a sub-scanning direction) along a guide rail 29 provided on the lower side of the stage 13. Further, the carriage 200 is supported so as to be movable in a Z direction (the vertical direction).

In the configuration of FIG. 2, the stage 13 on which a recording medium is placed is stationary. In the inkjet recording apparatus as illustrated in FIG. 2, an image is formed by alternately repeating a main-scanning operation where ink is jet from the nozzles N onto a recording medium while moving the recording heads in the main-scanning direction and a sub-scanning operation where the recording heads are moved in the sub-scanning direction.

In the present embodiment, the carriage 200 and the guide rod 19 function as a moving mechanism for movement in the main-scanning direction (X direction), and the carriage 200 and the guide rail 29 function as a moving mechanism for movement in the sub-scanning direction (Y direction).

Figure 3:
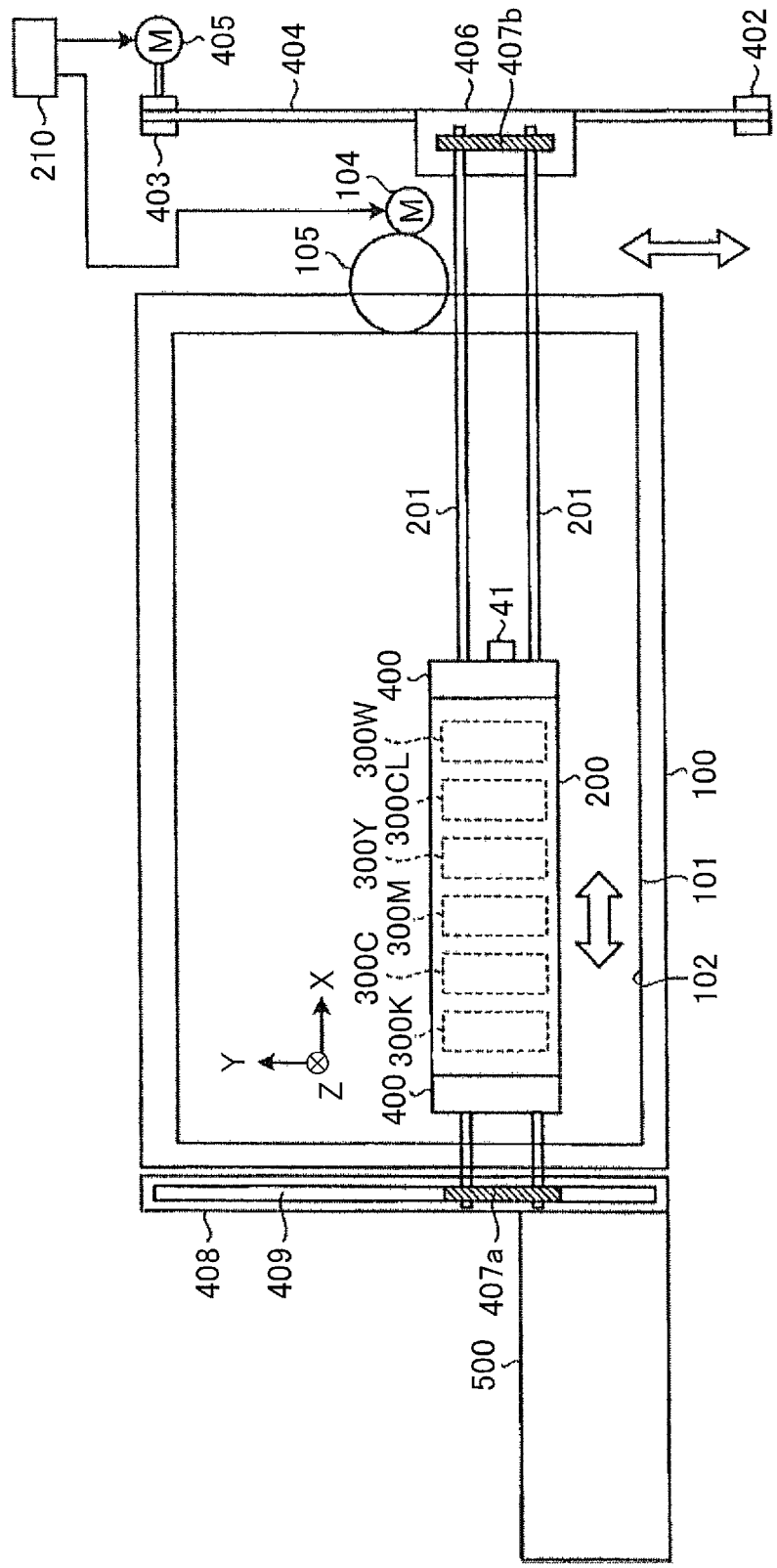
FIG. 3 is a plan view of a portion around an image forming unit of the image forming apparatus according to the embodiment.
Figure 4:
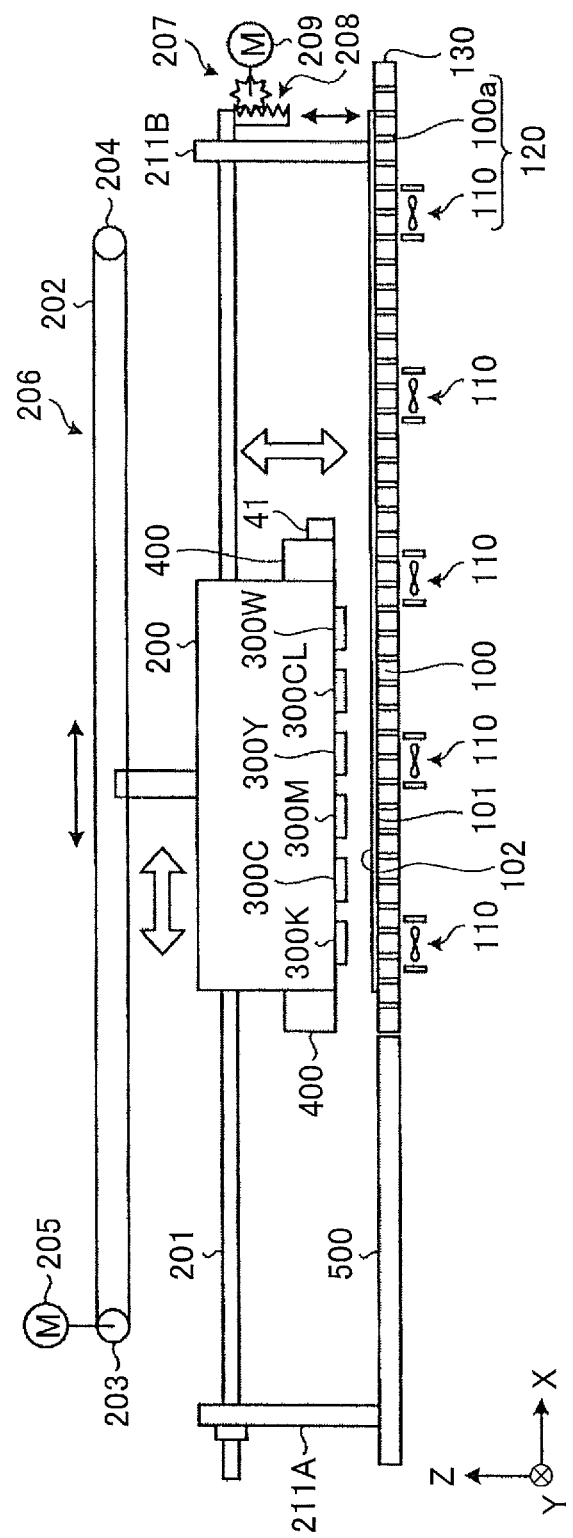
FIG. 4 is a front view of the portion around the image forming unit the image forming apparatus of FIG. 3.

FIG. 3 is a plan view of an inkjet recording apparatus 1 that is an image forming apparatus (liquid jetting apparatus) according to an embodiment, and FIG. 4 is a front view of the inkjet recording apparatus 1 of the present embodiment. In the configuration of FIG. 3 and FIG. 4, although the shape of a portion around the carriage is different from that in FIG. 2, other functions are substantially the same as those of the configuration of FIG. 2.

In the configuration of FIGS. 2 through 4, in the sub-scanning operation, recording heads 300K through 300W mounted on the carriage 200 are moved in the sub-scanning direction relative to a recording medium 101.

(Variations)

As a variation of the image forming apparatus of the present embodiment, the stage 13 (130) on which the recording medium 101 is placed may be configured to be movable. In this case, the stage 13 (130) functions as a moving mechanism that moves in the sub-scanning direction; and in the sub-scanning operation, the recording medium 101 is moved (conveyed) in the sub-scanning direction relative to the recording heads 300K through 300W.

In the example of FIG. 3, one head is provided in the sub-scanning direction in one head array. However, multiple heads may be provided in the sub-scanning direction in one head array (see FIG. 17).

Next, an example of a hardware configuration of an image forming system including an image forming apparatus (the inkjet recording apparatus 1/10) is described.

Figure 5:
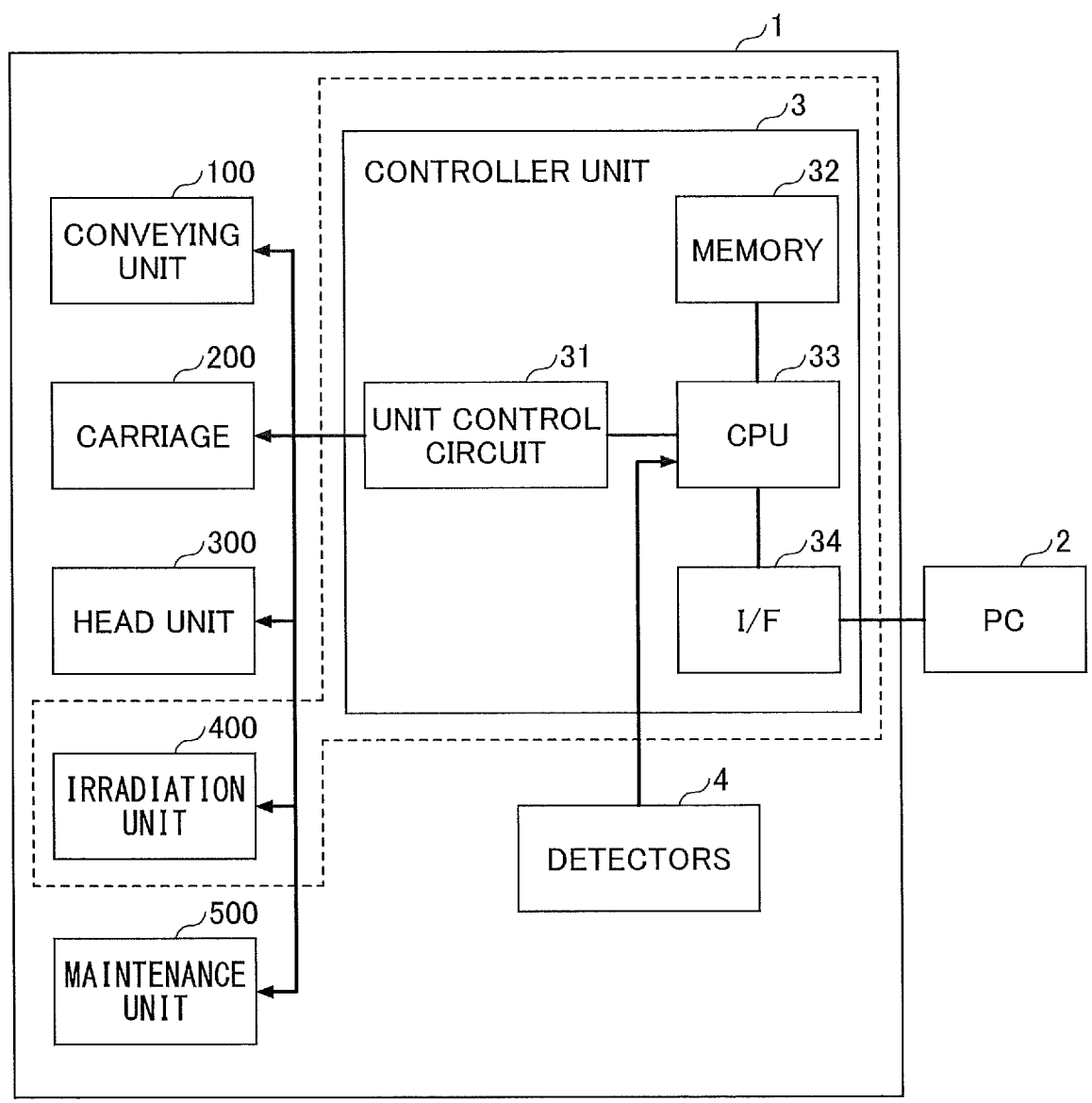
FIG. 5 is a block diagram illustrating an example of a hardware configuration of the image forming apparatus according to the embodiment.

FIG. 5 is a block diagram illustrating an example of a hardware configuration of an image forming system of the present embodiment. In the image forming system illustrated in FIG. 5, a personal computer (PC) 2, which is an external device, is connected to the image forming apparatus (the inkjet recording apparatus 1/10) that forms an image with a mechanical structure as illustrated in FIGS. 2 through 4, and the PC 2 performs image processing. Alternatively, functions related to the image processing performed by the PC 2 may be provided inside of the image forming apparatus.

As illustrated in FIG. 5, an image forming apparatus 30 (the inkjet recording apparatus 1/10) of the present embodiment includes a controller unit 3, detectors 4, a conveying unit 100 that is a conveying mechanism, a carriage 200, a head unit 300 (an example of a liquid jet head), an irradiation unit 400 (an example of an irradiator), and a maintenance unit 500.

The controller unit 3 includes a unit control circuit 31, a memory 32, a central processing unit (CPU) 33, and an I/F 34. A curing device may be implemented by at least the controller unit 3 and the irradiation unit 400 as indicated by a dotted line in FIG. 5.

The I/F 34 is an interface for connecting the image forming apparatus 30 (1, 10) to the external personal computer (PC) 2. The image forming apparatus 30 (1, 10) and the PC 2 may be connected to each other in any appropriate manner. For example, the image forming apparatus 30 (1, 10) and the PC 2 may be connected to each other via a network or directly connected to each other with a communication cable.

For example, the detectors 4 include various sensors provided in the inkjet recording apparatus 1 such as a height sensor 41 illustrated in FIGS. 3 and 4.

The CPU 33 uses the memory 32 as a work area and controls the operations of various units of the inkjet recording apparatus 1 via the unit control circuit 31. Specifically, the CPU 33 controls the operations of the units based on recording data received from the PC 2 and data detected by the detectors 4 and thereby forms an image, which is a liquid applied surface 102, on the recording medium 101 (which is also referred to as a base material).

A printer driver is installed in the PC 2, and the printer driver generates recording data to be sent to the inkjet recording apparatus 1 based on image data. The recorded data includes command data for operating the conveying unit 100 of the inkjet recording apparatus 1 and pixel data of an image (the liquid applied surface 102). The pixel data expresses each pixel with two-bit data, i.e., in four gradation levels.

Next, with reference to FIGS. 3 through 5, the components of the mechanical structure of the image forming apparatus are described. The conveying unit 100 includes the stage 130 and the suction mechanism 120. The suction mechanism 120 includes fans 110 and multiple suction holes 100a provided in the stage 130. The suction mechanism 120 temporarily fixes the recording medium 101 to the conveying unit 100 by driving the fans 110 and thereby suctioning the recording medium 101 through the suction holes 100a. The suction mechanism 120 may use electrostatic attraction to attract the recording medium 101. The movement of the conveying unit 100 in the Y-axis direction (the sub-scanning direction) is controlled based on a drive signal from the CPU 33 (the unit control circuit 31).

The conveying unit 100 includes a conveyance control unit 210, a roller 105, and a motor 104 in the configuration illustrated in FIG. 3 and FIG. 4. The conveyance control unit 210 can move the recording medium 101 in the Y-axis direction (the sub-scanning direction) by driving the motor 104 and thereby rotating the roller 105.

Instead of moving the recording medium 101, the conveying unit 100 may move the carriage 200 in the Y-axis direction (the sub-scanning direction) as illustrated in FIG. 2. That is, the conveying unit 100 moves one of the recording medium 101 and the carriage 200 in the Y-axis direction (the sub-scanning direction) relative to the other.

For example, as illustrated in the right side of FIG. 3, the conveying unit 100 includes a side plate 407b that supports two guides 201 for guiding the carriage 200 in the X-axis direction (the main-scanning direction), a base 406 that supports the side plate 407b, a belt 404 fixed to the base 406, a drive pulley 403 and a driven pulley 402 over which the belt 404 is stretched, a motor 405 that rotates the drive pulley 403, and the conveyance control unit 210.

Also, as illustrated in the left side of FIG. 3, the conveying unit 100 includes a side plate 407a supporting the two guides 201 for guiding the carriage 200 in the X-axis direction (the main-scanning direction), a base 408 that slidably supports the side plate 407a, and a groove 409 that is formed in the base 408 and guides the side plate 407a in the sub-scanning direction.

In the conveying unit 100, the conveyance control unit 210 drives the motor 405 to rotate the drive pulley 403 and thereby move the belt 404 in the Y-axis direction (the sub-scanning direction). The base 406 supporting the carriage 200 moves in the Y-axis direction (the sub-scanning direction) along with the movement of the belt 404 and thereby moves the carriage 200 in the Y-axis direction (the sub-scanning direction). As the base 406 moves in the Y-axis direction (the sub-scanning direction), the side plate 407a moves in the Y-axis direction (the sub-scanning direction) along the groove 409 of the base 408.

In the embodiment illustrated in FIG. 3 and FIG. 4, the carriage 200, the guides 201, and a scanning mechanism 206 constitute a moving mechanism for movement in the main-scanning direction (X direction). When the carriage 200 also moves in the sub-scanning direction, the carriage 200, the base 406, the belt 404, the drive pulley 403, the driven pulley 402, and the motor 405 constitute a moving mechanism for movement in the sub-scanning direction. When the stage 130 moves, the conveying unit 100 including the stage 130, the roller 105, and the motor 104 constitute a moving mechanism for movement in the sub-scanning direction (the Y direction).

As illustrated in FIGS. 3 and 4, the head unit 300 is disposed on the lower side of the carriage 200 and includes head arrays (recording heads) 300K, 300C, 300M, 300Y, 300CL, and 300W that discharge K, C, M, Y, CL, and W UV-curable inks (examples of liquids), respectively.

Each of the head arrays 300K through 300W includes one or more heads. When a head array includes multiple heads, the heads may be arranged in a staggered manner or in a row.

Each head includes a piezoelectric actuator that is a drive element. When a drive signal is applied to the piezoelectric actuator from the CPU 33 (the unit control circuit 31), the piezoelectric actuator contracts and causes pressure change, and the head discharges a UV-curable ink onto the recording medium 101. As a result, a liquid applied surface 102 (an example of a liquid applied surface) is formed on the recording medium 101.

For example, an ink containing a methacrylate monomer is preferably used as a UV-curable ink for the present embodiment. A methacrylate monomer has an advantage of having relatively weak skin sensitization, but the degree of curing shrinkage of the methacrylate monomer is greater than that of general inks.

The irradiation unit 400 is provided on a lateral side (a side facing the X-axis direction) of the carriage 200, and emits UV light based on a drive signal from the CPU 33 (the unit control circuit 31). The irradiation unit 400 is mainly composed of a UV emitting lamp that emits UV light.

The movements of the carriage 200 in the Z-axis direction (the height direction) and the X-axis direction (the main-scanning direction) are controlled based on drive signals from the CPU 33 (the unit control circuit 31).

The carriage 200 moves in the main-scanning direction (the X-axis direction) along the guides 201. The scanning mechanism 206 includes a drive pulley 203, a driven pulley 204, a drive belt 202, and a motor 205. The carriage 200 is fixed to the drive belt 202 that is stretched over the drive pulley 203 and the driven pulley 204. The carriage 200 is moved laterally in the main-scanning direction by driving the drive belt 202 with the motor 205. The guides 201 are supported by the side plates 211A and 211B of the body of the apparatus.

A height adjustor 207 includes a motor 209 and a slider 208. The height adjustor 207 moves the slider 208 up and down by driving the motor 209 and thereby moves the guides 201 up and down. As the guides 201 move up and down, the carriage 200 moves up and down, and the height of the carriage 200 relative to the recording medium 101 is adjusted.

<Image Forming Operation>

An image forming operation of the inkjet recording apparatus 1 illustrated in FIG. 2 is described below.

First, the conveying unit 100 moves in the Y-axis direction (the sub-scanning direction) based on a drive signal from the CPU 33 (the unit control circuit 31), and places the recording medium 101 in an initial position for forming an image (the liquid applied surface 102).

Next, based on a drive signal from the CPU 33 (the unit control circuit 31), the carriage 200 moves to a height suitable for jetting a UV-curable ink from the head unit 300 (for example, a height at which the gap between the lower side of each head in the head arrays 300K to 300W of the head unit 300 and the recording medium 101 becomes 1 mm). The height of the head unit 300 is detected by the CPU 33 via the height sensor 41.

Next, the carriage 200 reciprocates in the X-axis direction (the main-scanning direction) based on a drive signal from the CPU 33 (the unit control circuit 31), and during this reciprocating movement, the head unit 300 jets UV-curable ink based on a drive signal from the CPU 33 (the unit control circuit 31). As a result, an image (the liquid applied surface 102) corresponding to one scan is formed on the recording medium 101.

Next, when an image (the liquid applied surface 102) corresponding to one scan is formed on the recording medium 101, the conveying unit 100 moves in the Y-axis direction (the sub-scanning direction) by a distance corresponding to one scan based on a drive signal from the CPU 33 (the unit control circuit 31).

Thereafter, until the formation of an image (the liquid applied surface 102) is completed, the operation of forming an image (the liquid applied surface 102) corresponding to one scan and the operation of moving the conveying unit 100 in the Y-axis direction by a distance corresponding to one scan are performed alternately.

Then, when the formation of the image (the liquid applied surface 102) on the recording medium 101 is completed and after a time (which may be referred to as "leveling time") necessary for the UV-curable ink to become smooth passes, the irradiation unit 400 irradiates the image with UV light.

<Functional Configuration of First Embodiment>

Figure 6:
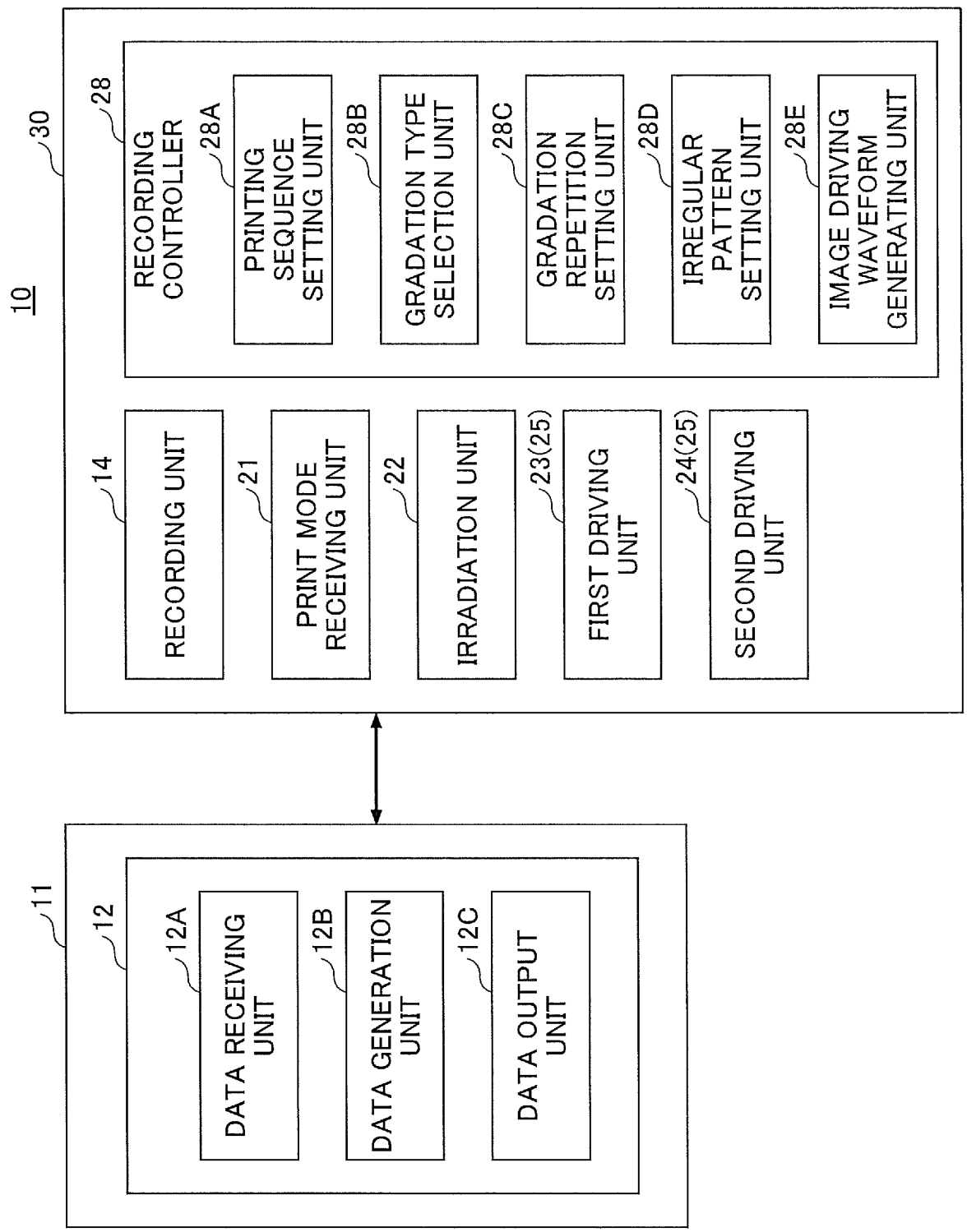
FIG. 6 is a functional block diagram of a controller related to image processing of an image forming apparatus according to a first embodiment.

Next, a functional configuration of an image forming system according to the first embodiment is described. FIG. 6 is a block diagram illustrating a functional configuration of an image forming system related to image processing according to the first embodiment.

The image processing apparatus 11 includes a main controller 12. The main controller 12 is a computer including a CPU and controls the entire image processing apparatus 11. The main controller 12 may be implemented by a circuit other than a general-purpose CPU.

Further, the image processing apparatus 11 may be implemented by the PC 2 connected to the image forming apparatus 30 as illustrated in FIG. 6, or may be provided inside of the image forming apparatus 30.

The main controller 12 includes a data receiving unit 12A, a data generation unit 12B, and a data output unit 12C. A part or the entirety of the data receiving unit 12A, the data generation unit 12B, and the data output unit 12C may be implemented by software, i.e., by executing a program with a processor such as a CPU, may be implemented by hardware such as an integrated circuit (IC), or may be implemented by a combination of software and hardware.

The data receiving unit 12A receives image data. Image data is information such as the shape and color of an image to be formed. The data receiving unit 12A may obtain image data from an external device via a communication unit, or obtain image data from a storage unit provided in the image processing apparatus 11.

The data generation unit 12B performs predetermined data processing such as mask processing on the image data received by the data receiving unit 12A. Examples of image data generated in the present embodiment include image data (for example, JPEG image data), and color ink image data and clear ink image data that are generated based on desired glossiness.

The data output unit 12C outputs the image data generated by the data generation unit 12B to the image forming apparatus 30.

The image forming apparatus 30 (1, 10) includes a recording unit 14, a print mode receiving unit 21, an irradiation unit 22, a driving unit 25 (23, 24), and a recording controller 28.

The recording unit 14 is a head driver that drives each of the heads in the head arrays 300K through 300W to jet liquid based on image data controlled by the recording controller 28.

The driving unit 25 drives the moving mechanism. The first driving unit 23 causes the carriage 200 to move in the X direction during scanning, and the second driving unit 24 causes the carriage 200 or the recording medium 101 to move in the sub-scanning direction during sub-scanning.

The recording controller 28 receives print data from the image processing apparatus 11. The recording controller 28 controls the recording unit 14, the driving unit 25, and the irradiation unit 22 and causes the heads to jet droplets corresponding to pixels according to the received print data.

For example, the recording controller 28 calculates the time from the discharge of ink to the emission of light, calculates the glossiness of an image formed on the recording medium 101 based on the amount of discharged ink and the time until the emission of light, and calculates the amount of clear ink to be discharged to make the glossiness uniform.

The recording controller 28 includes a printing sequence setting unit 28A, a gradation type selection unit 28B, a gradation repetition setting unit 28C, an irregular pattern setting unit 28D, and an image driving waveform generating unit 28E.

The printing sequence setting unit 28A sets a printing sequence based on image data and a print mode. Setting a printing sequence (see FIG. 7) defines, for each image region, how many times the carriage 200 including the recording unit 14 is moved in the outbound or inbound direction in the main-scanning direction to form an image. The printing sequence setting unit 28A also controls formation of color ink images based on color ink image data. That is, the printing sequence setting unit 28A controls the order of ink colors to be formed, the amounts of inks to be discharged, and the positions where inks are discharged (dot positions).

Figure 12:
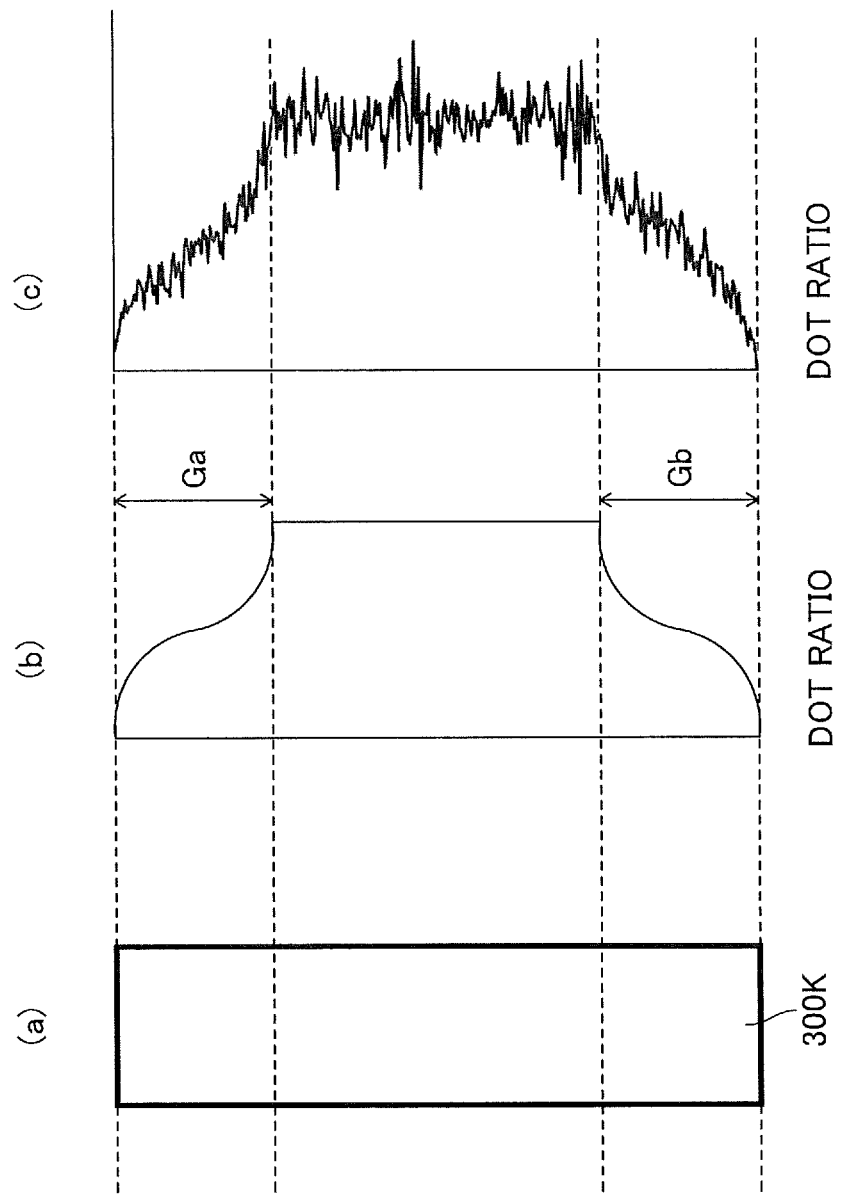
FIG. 12 is a drawing illustrating an example where a jetting control method of an embodiment is applied to a recording head unit including one head.
Figure 20:
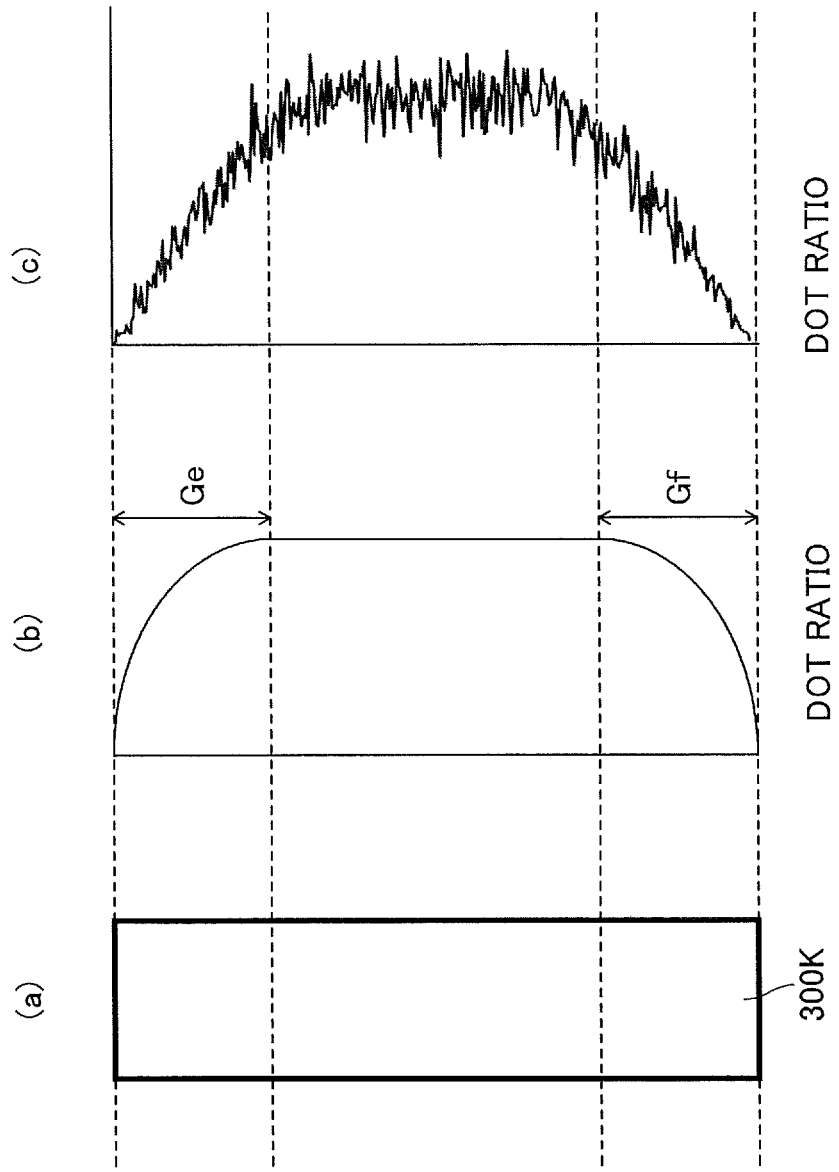
FIG. 20 is a drawing for explaining a dot ratio according to a second embodiment.
Figure 21:
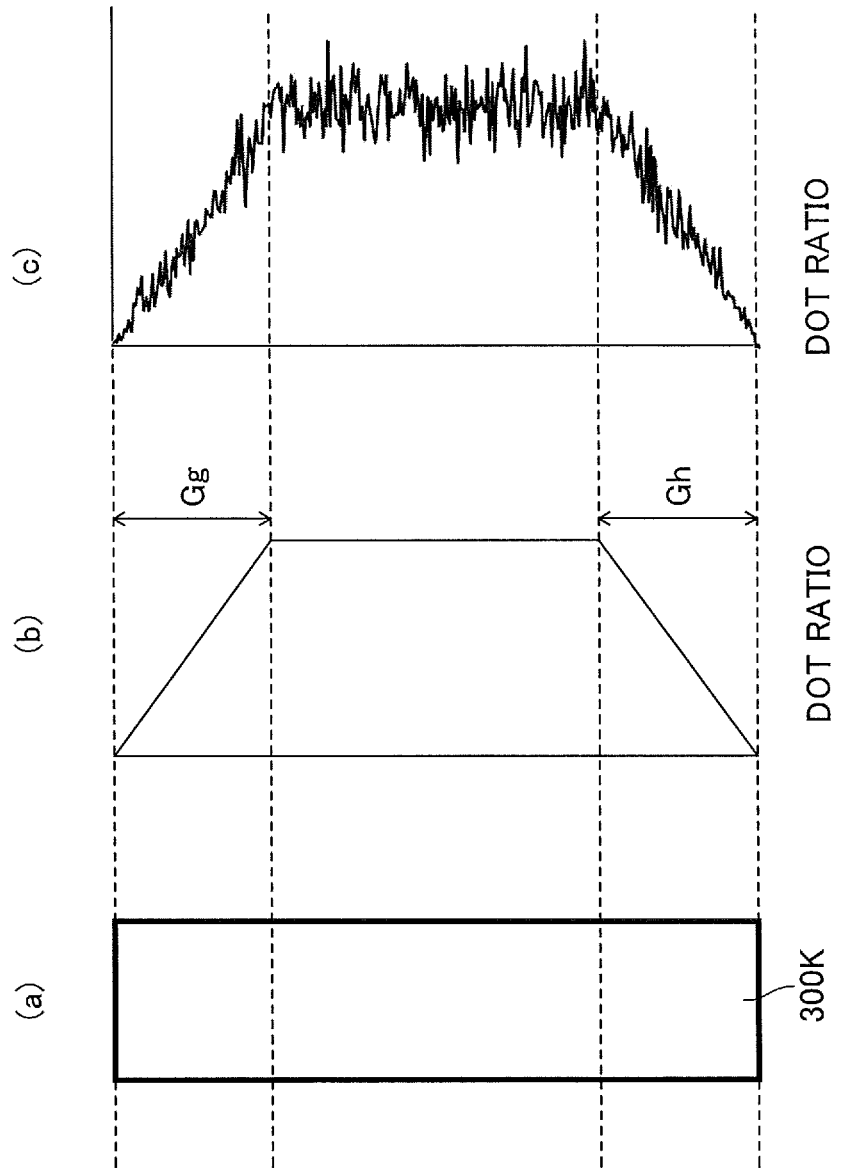
FIG. 21 is a drawing for explaining a dot ratio according to a third embodiment.

The gradation type selection unit 28B selects a type of gradation (FIG. 12, FIG. 20, FIG. 21).

Figure 17:
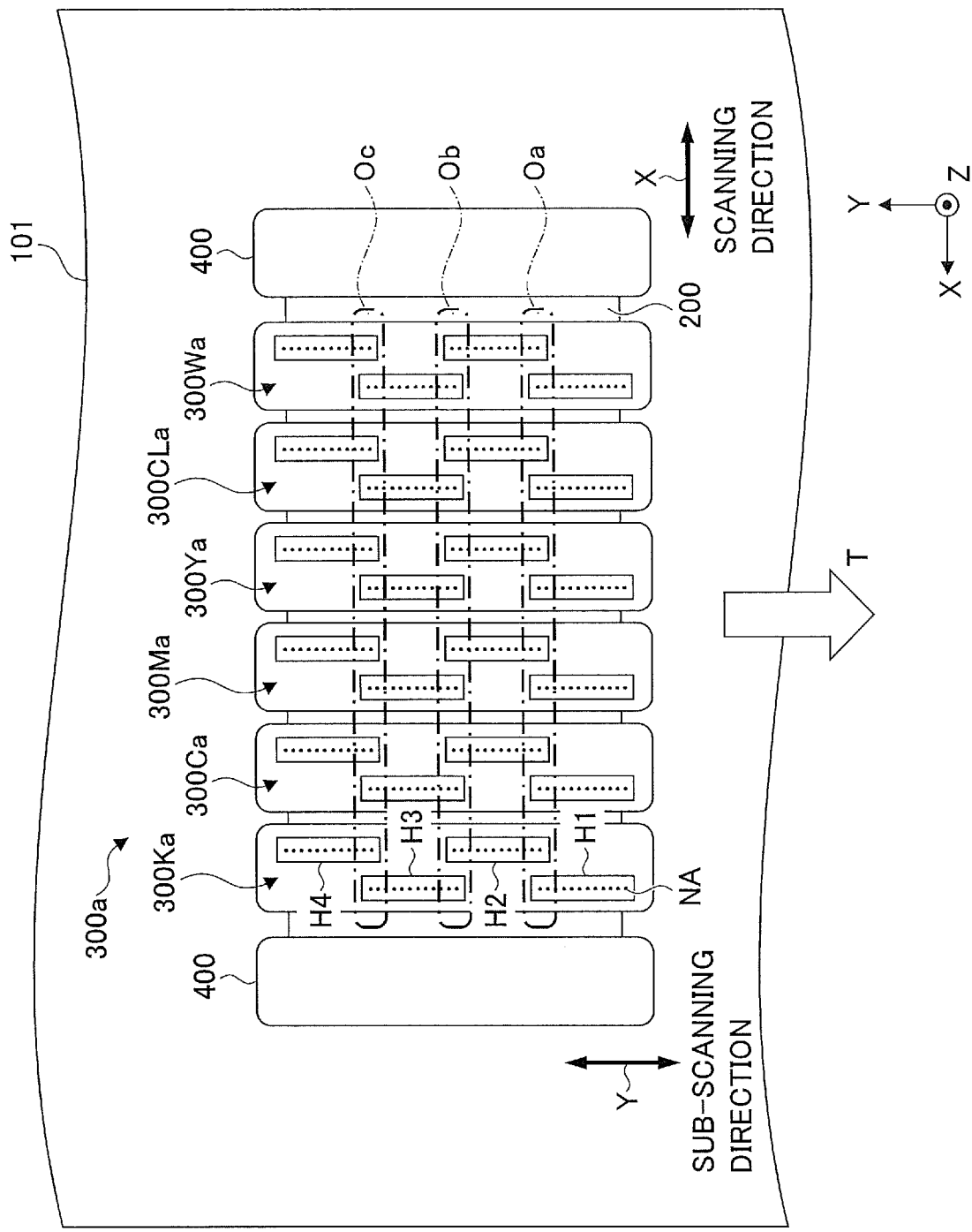
FIG. 17 is a plan view of a portion around an image forming unit that includes head arrays in each of which multiple heads are arranged in a staggered manner.
Figure 18:
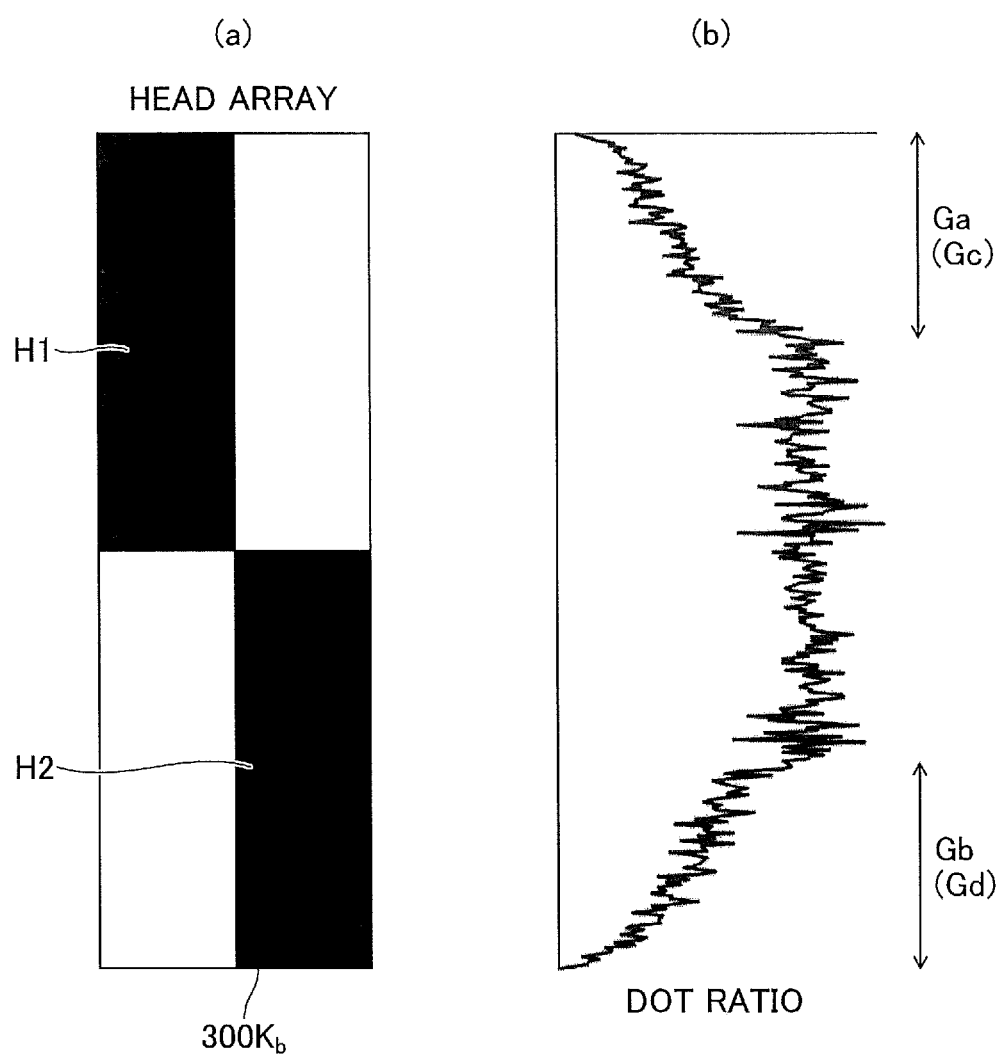
FIG. 18 is a drawing illustrating an example in which a gradation mask is applied to a gradation repetition unit that is a head array including two heads.
Figure 19:
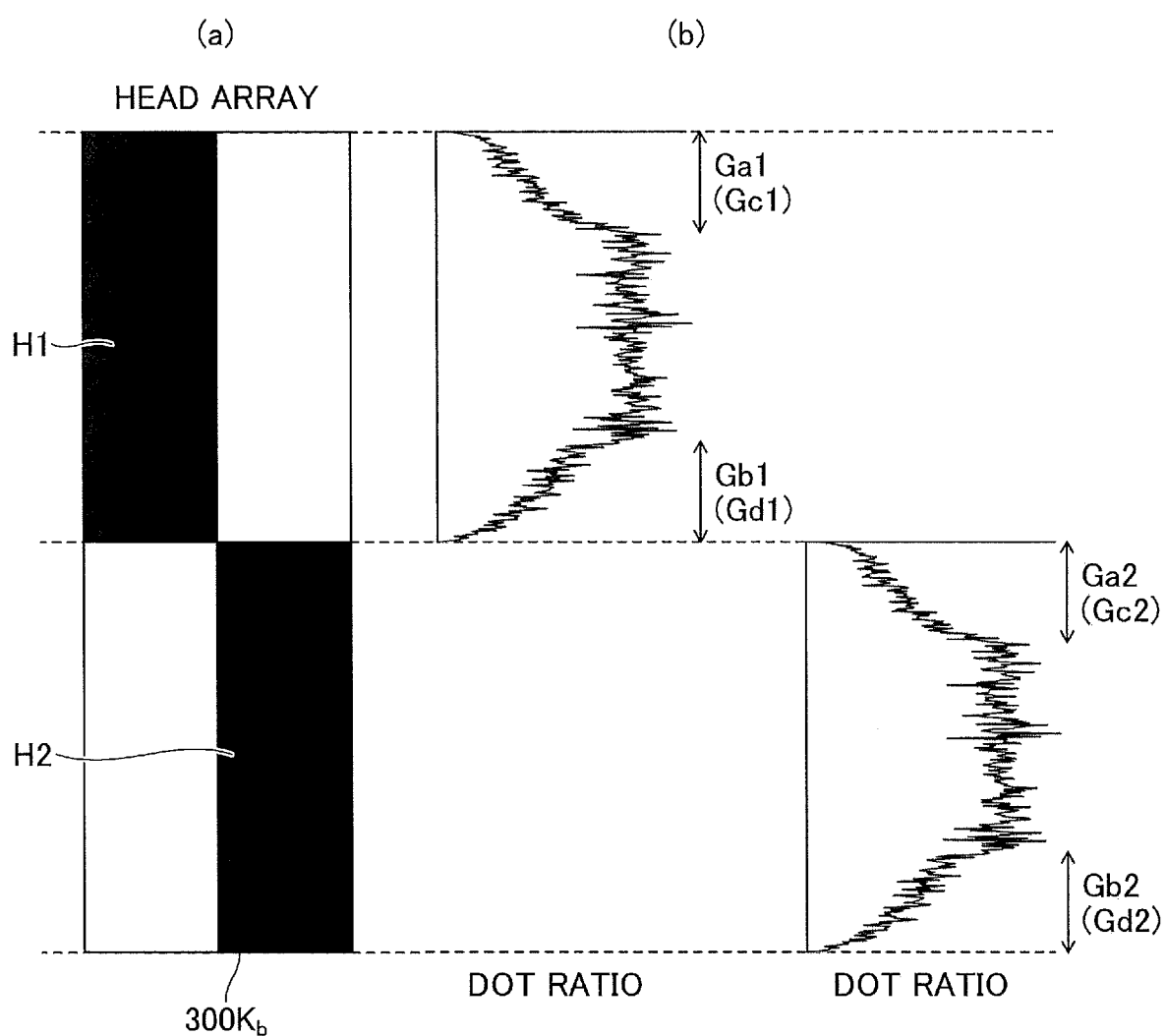
FIG. 19 is a drawing illustrating an example in which a gradation mask is applied to each head of a head array that is set as a gradation repetition unit.

When multiple heads are provided in each head array as illustrated in FIG. 17, the gradation repetition setting unit 28C determines whether to assign a gradation pattern to each head array as illustrated in FIG. 18 or to each head as illustrated in FIG. 19. When only one head is provided in the recording head unit in the sub-scanning direction as illustrated in FIG. 3 and FIG. 10, this function may be omitted. The gradation type selection unit 28B and the gradation repetition setting unit 28C function as a gradation setting unit.

Specifically, a gradation indicates a pattern where the middle portion in the sub-scanning direction is darker and the end portions are lighter (i.e., a pattern where the number of dots per unit area discharged from the nozzles becomes smaller toward the ends, the number of dots per unit area is hereafter referred to as a dot ratio and may also be referred to as a discharge amount, a recording rate, a discharge rate, or a printing percentage). Specific examples of gradation assignment patterns are described later with reference to FIG. 10 and subsequent figures. The gradation may not necessarily indicate a monotonous increase or decrease, and may also indicate an increase or decrease in the moving average.

Here, the dot ratio indicates the percentage of pixels output by an ink jetting operation according to values of pixel data among the pixels in the pixel data corresponding to the nozzles in each head of the head unit. For example, in a case where X droplets (X is an integer) can be jetted from a specific nozzle when the head unit 300 is scanned at a predetermined speed, the dot ratio becomes 100% if the nozzle performs a jetting operation at all positions. However, because there is a case where the jetting operation is not performed at all positions, the dot ratio (%) is obtained as the percentage, in X droplets, of the number of times output data (drive data) for actually performing the jetting operation is applied.

The irregular pattern setting unit 28D applies irregular noise to each gradation repetition unit. The irregular pattern setting unit 28D may apply irregular noise using a random function or may apply random noise using any other method.

In the examples described below, irregular noise is applied even to the middle portion of a gradation repetition unit where gradation is not applied. However, in the present invention, random noise may not be applied to the middle portion, and the random noise may be applied to the entire region where the dot ratio varies due to at least gradation.

The image driving waveform generating unit 28E is an example of a mask processing unit. The image driving waveform generating unit 28E applies a gradation mask to generate a gradation pattern for each repetition unit, and generates drive data based on image data obtained by superposing irregular noise on at least gradation regions at the nozzle ends.

The recording unit 14 (head driving unit) drives each of heads (or head arrays) 300K through 300W corresponding to respective colors or each of heads H1 through H4 (see FIG. 17) arranged in the sub-scanning direction to cause multiple nozzles N to jet a liquid based on drive data generated by the image driving waveform generating unit 28E.

In the example of FIG. 6, the image forming apparatus 30 includes a function for adjusting a gradation assignment pattern. Alternatively, the function for adjusting a gradation assignment pattern may be provided in the data generation unit 12B of the image processing apparatus 11 (or the PC 2).

Also, a jetting control program for a gradation assignment pattern may be provided in advance in another information processing apparatus (for example, a higher-level apparatus) connected to the PC 2 in the format of a calculation file (e.g., a comma separated value (CSV) file or an Excel file), and the PC 2 may read and execute the jetting control program.

<Printing Sequence>

The adjustment of the gradation and the irregular pattern of present embodiment can be applied to multipass interlacing (multipass print mode) such as bidirectional printing.

Figure 7:
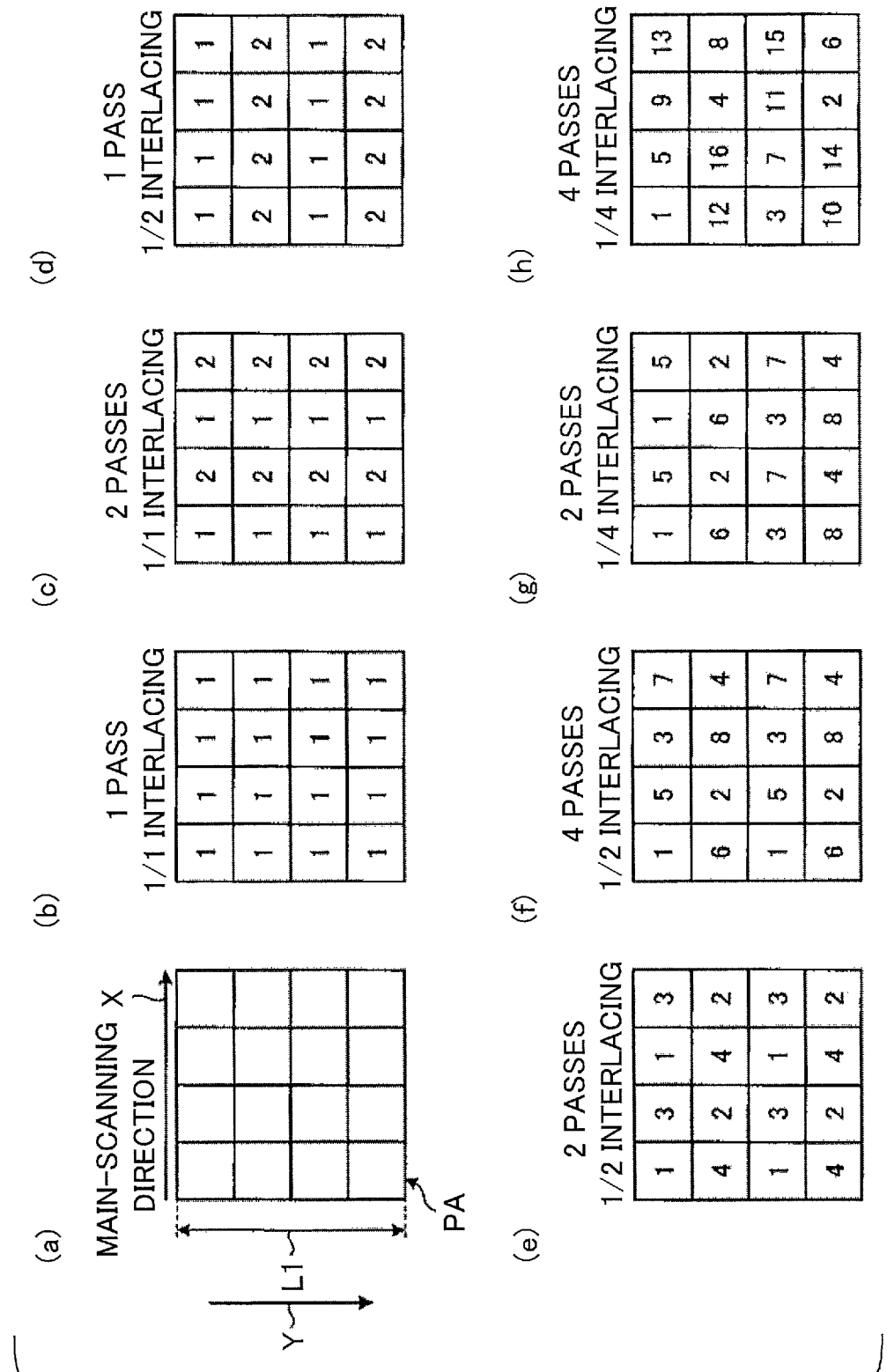
FIG. 7 is a drawing illustrating printing sequence patterns.

Here, printing sequences, which include multipass interlacing, for image conversion where image data is generated from a document (original data) for each scan are described. FIG. 7 is a drawing illustrating multiple printing sequence patterns for an image conversion process.

In the image conversion process, the data generation unit 12B (see FIG. 6) converts image data in the unit of an image output by each scan of the head unit 300 in the main-scanning direction X according to the print width, the order of printing, and the configuration of the head arrays 300K through 300W.

Each of cells included in squares (a) through (h) illustrated in FIG. 7 represents one dot of a recorded image. Also, the numbers in the cells represent the scanning sequence of the head. Image data is formed by repeating the patterns illustrated in FIG. 7 in the main-scanning direction X and the sub-scanning direction Y.

The number of scans in the main-scanning direction X may be referred to as "pass". That is, one pass indicates that the number of scans in the main-scanning direction X is one, and two passes indicate that the number of scans in the main-scanning direction X is two.

Also, the number of scans in the sub-scanning direction Y may be referred to as "interlacing". That is, 1/1 interlacing indicates that the number of scans in the sub-scanning direction Y is one, and 1/2 interlacing indicates that the number of scans in the sub-scanning direction Y is two.

Further, the number of types of scanning may be referred to as a scanning count N. Specifically, in the case of "1 pass, 1/1 interlacing" illustrated in FIG. 7 (*b*), N is 1. In the case of "2 passes, 1/1 interlacing" illustrated in FIG. 7 (*c*) or "1 pass, 1/2 interlacing" illustrated in FIG. 7 (*d*), N is 2.

In the case of "2 passes, 1/2 interlacing" illustrated in FIG. 7 (*e*), N is 4. In the case of "4 passes, 1/2 interlacing" illustrated in FIG. 7 (*f*) or "2 passes, 1/4 interlacing" illustrated in FIG. 7 (*g*), N is 8. In the case of "4 passes, 1/4 interlacing" illustrated in FIG. 7 (*h*), N is 16.

The one pass sequence illustrated in each of FIG. 7 (*b*) and FIG. 7 (*d*) may be referred to as a normal mode, and the multipass sequence illustrated in each of FIG. 7 (*c*), FIG. 7 (*e*), FIG. 7 (*f*), FIG. 7 (*g*), and FIG. 7 (*h*) may be referred to as a multipass print mode.

The control method of the present embodiment is directed to suppress density and gloss banding caused by the layering of images in bidirectional printing where images are printed and layered. Therefore, a formation region (landing region) on a recording medium is formed by multipass interlacing as illustrated in FIG. 7.

In the inkjet recording apparatus 1/10, a multipass print mode, the number of passes in the multipass print mode, an interlacing print mode, and the number of interlacing in the interlacing print mode may be specified in advance in the initial printing method setting; and the specified print mode (multipass print mode), the number of passes, and the number of interlacing are stored in a storage medium such as a memory (not shown).

The setting of the gradation assignment pattern according to the present embodiment is described below based on an assumption that the printing sequence is multipass interlacing.

<Examples of Gloss Banding that Occurs in Multipass Interlacing Printing>

Gloss banding that occurs when an image is formed in a multipass interlacing print mode is described with reference to FIG. 8 and FIGS. 9A and 9B.

Figure 8:
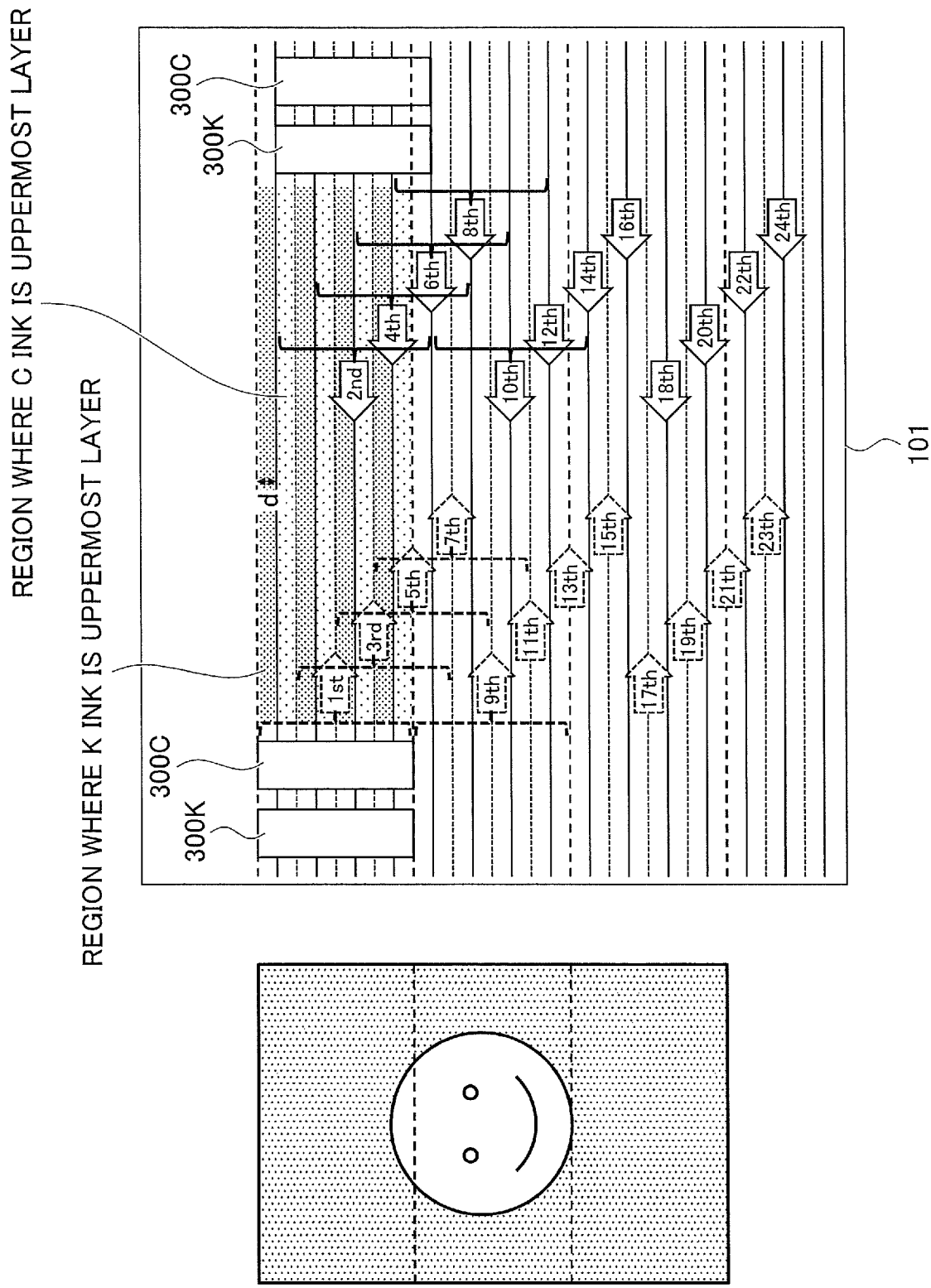
FIG. 8 is a drawing for explaining how gloss banding occurs in multipass interlacing.
Figure 9A:
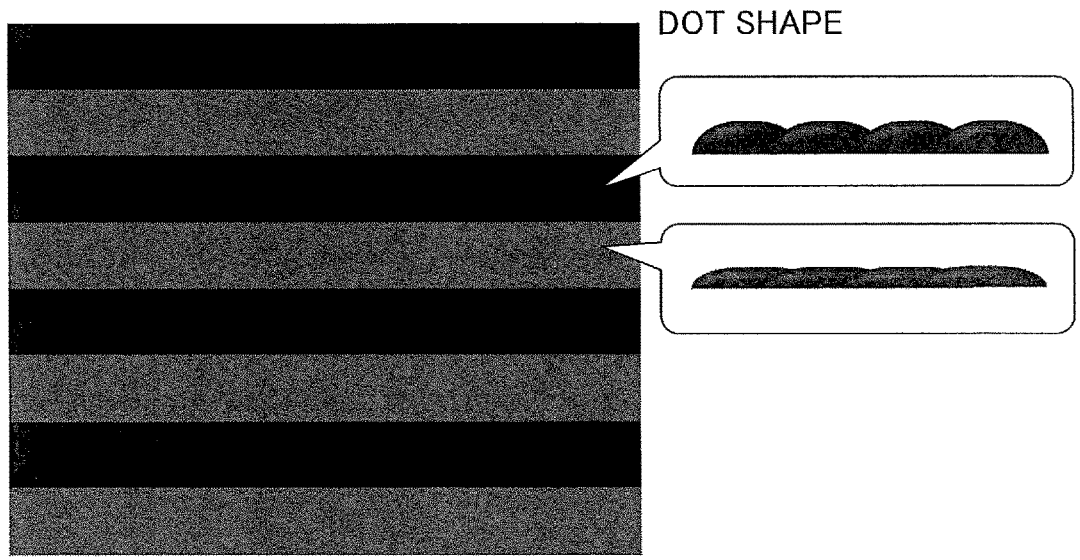
FIGS. 9A and 9B are drawings illustrating gloss banding.
Figure 9B:
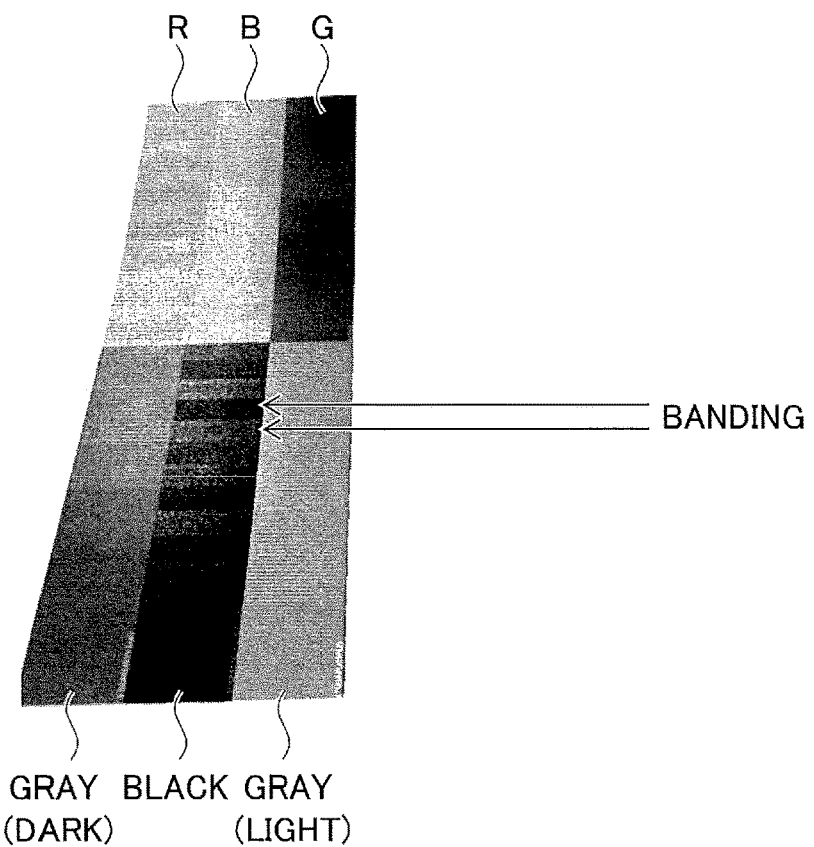

FIG. 8 is a drawing for explaining how gloss banding occurs, and FIGS. 9A and 9B are drawings illustrating gloss banding. Specifically, FIG. 8 illustrates gloss banding that occurs when an image is formed on the recording medium 101 by scanning an image region eight times according to the printing sequence of N=8 illustrated in FIG. 7 (*f*) or FIG. 7 (*g*). FIG. 9A is a drawing illustrating a black solid image, and FIG. 9B is a drawing illustrating a recording medium filled with multiple colors.

As illustrated in FIG. 8, when bidirectional printing is performed using multiple head arrays, the color of the uppermost layer varies depending on the difference in the order in which dots are layered.

When bidirectional printing is performed in such a manner, the time after ink is discharged and until the ink is irradiated with UV light for chemical reaction varies depending on the difference in the order in which dot colors are layered. For this reason, boundaries may be formed between cured portions and uncured portions due to the difference in time for which the ink cures and shrinks after landing. Such boundaries between cured and uncured portions are formed like bands extending in the scanning direction (the main-scanning direction) of the heads, and gloss banding, which indicates gloss unevenness, occurs in a recorded image.

As illustrated in FIG. 8 and FIGS. 9A and 9B, the boundaries are formed like bands extending in the main-scanning direction of the heads, and gloss banding, which indicates gloss unevenness, occurs due to differences in height of cured ink of the recorded image.

Also, as indicated by the picture of FIG. 9B, gloss banding tends to occur particularly in black.

Comparative Examples

FIG. 10 is a drawing illustrating a head, a dot ratio, and gradation according to a comparative example. In FIG. 10, (a) indicates a head, (b) indicates a dot ratio distribution, and (c) indicates an example of gradation on a recording medium corresponding to the dot ratio distribution.

In this comparative example, as illustrated in FIG. 10 (b), symmetrical gradation curves in the dot ratio are applied to the ends of the nozzle array. Specifically, the gradation curves in gradation regions (setting regions) G1 and G2 at the nozzle ends have S-curve shapes, and the setting regions have the same width.

When the S-curve shapes are axisymmetric, the gradation curve on one end and the gradation curve on the other end can complement the density of each other at the nozzle ends (the ends of the nozzle array) within the setting regions G1 and G2.

Figure 11:
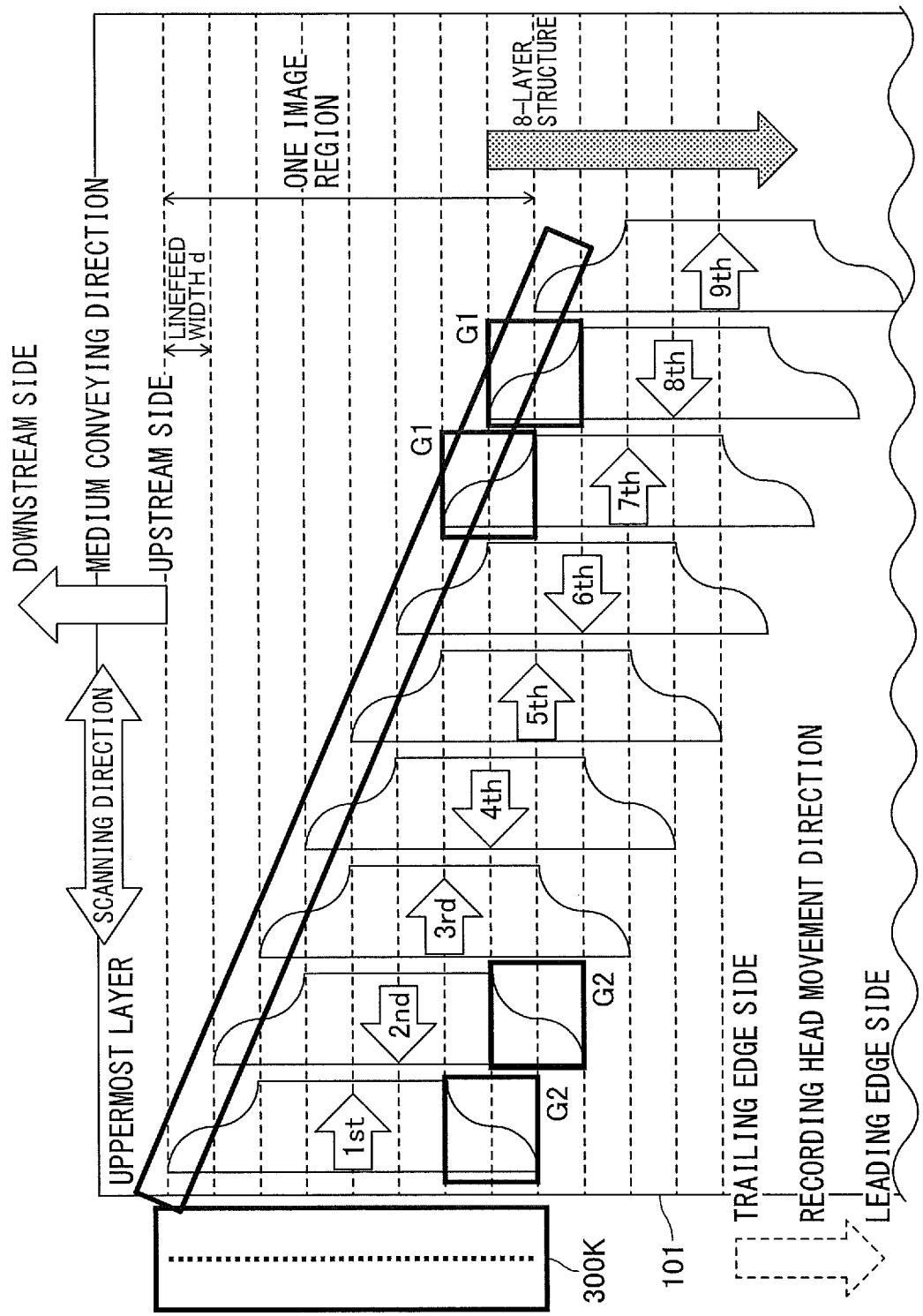
FIG. 11 is a drawing illustrating an example where a dot ratio gradation mask of the comparative example is applied to a recording head unit with one head in a printing sequence where one image region is formed by eight scans.

FIG. 11 is a drawing illustrating an example where the dot ratio gradation mask of the comparative example is applied to a recording head unit with one head in a printing sequence where one image region is formed by eight scans.

As illustrated in FIG. 11, in the case of multipass interlacing where scanning is performed while performing line feed, the width of the gradation region (setting region) is preferably set at an integral multiple of the linefeed width in the scanning by the carriage 200. In this example, the width of each of the setting regions G1 and G2, in which the gradation mask is set to gradually decrease the image density toward the end, is set at twice of the linefeed width (pass) d.

Because the scanning is performed while performing line feed or moving among the passes, the image data is divided into blocks corresponding to the number of passes in the sub-scanning direction of the scanning region of the heads, and the image is formed such that the passes overlap each other and complement each other. Because gradation curves are formed at the head ends or the head array ends that correspond to joints between blocks, the images formed in the forward pass and the backward pass complement each other such that the boundary between the images becomes less distinguishable.

Thus, the image region of the heads is divided into multiple blocks defined by line feeds, and the different blocks are in a complementary relationship.

Specifically, when the printing sequence is multipass interlacing (FIG. 7 (c) through (h)), image data is assigned to each of blocks obtained by dividing the image region in the sub-scanning direction. For example, images are formed while moving the head in the sub-scanning direction by line feed such that the images formed in different scans complement each other.

Specifically, in the example of FIG. 11, in one image region, a gradation region G2 at the upstream end in the conveying direction in the first scan and a gradation region G1 at the downstream end in the conveying direction in the seventh scan complement each other; and a center-side part of a gradation region G2 at the upstream end in the conveying direction in the second scan and an end-side part of a gradation region G1 at the downstream end in the conveying direction in the eighth scan complement each other.

As a result, when, for example, forming a solid image, in each of landing regions at the eighth and subsequent scans, an eight-layer structure including eight layers (eight passes) of images is formed on the recording medium 101. Thus, all of the eight-layer structures have substantially the same thickness. This prevents formation of partial steps resulting from differences in the thickness of layer structures and thereby makes it possible to further suppress gloss unevenness.

Such gradation masks make it possible to prevent density unevenness and gloss unevenness at head ends. However, because these gradation masks cause the dot ratios to change regularly, there is a risk that the granularity increases due to periodic unevenness and merging of dots.

<Adjustment of Dot Ratio According to First Embodiment (Head Unit Including One Head)>

FIG. 12 is a drawing illustrating an example where a jetting control method of the present embodiment is applied to a recording head unit including one head. In FIG. 12, (a) indicates a head, (b) indicates a dot ratio distribution when gradation masks are applied to the head ends, and (c) indicates a dot ratio distribution of the present embodiment obtained by superposing irregular noise on (b).

In an image control method of the first embodiment, symmetric gradation curves are applied to the nozzle ends as illustrated in FIG. 12 (b), and the dot ratio is irregularly changed as illustrated in FIG. 12 (c).

Here, the gradation mask illustrated in FIG. 12 (b) is applied to portions of image data corresponding to setting regions at the ends of the recording head unit in the sub-scanning direction such that the number of dots discharged from the nozzles decreases toward the ends of the recording head unit.

Setting regions Ga and Gb at the ends of the nozzle array to which gradation is applied are set to have the same width such that gradation is applied to the same number of nozzles in both of the setting regions Ga and Gb. With this configurations, gradations applied to the same range at the ends of the nozzle array can complement each other.

Figure 13:
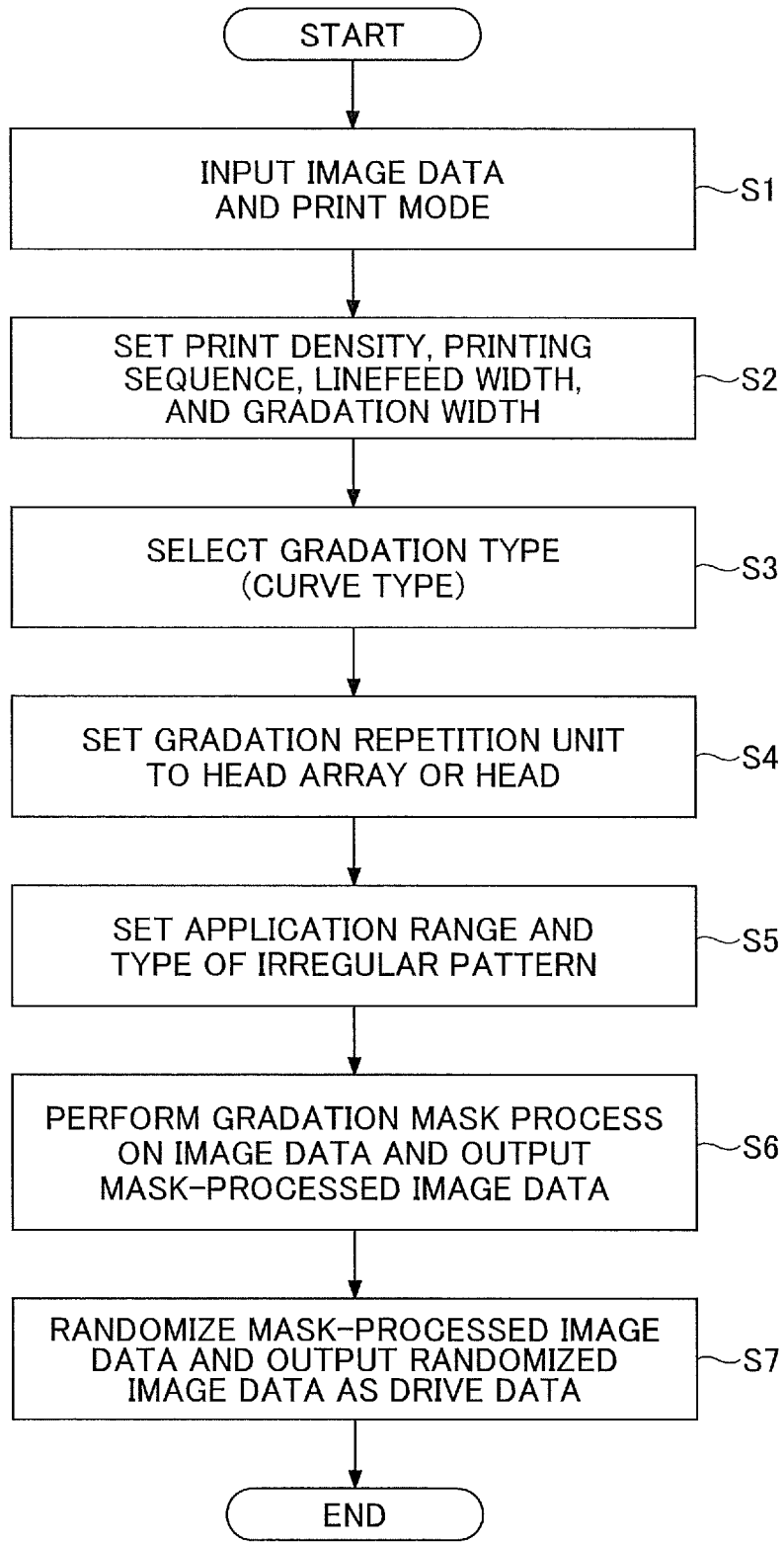
FIG. 13 is a flowchart illustrating an image control setting process according to an embodiment.

FIG. 13 illustrates an image adjustment (jetting adjustment) setting process according to the present embodiment. FIG. 13 is a flowchart illustrating the image adjustment setting process according to an embodiment.

At step S1, image data and a print mode are input. The print mode includes, for example, a printing speed, an image type (text, illustration, or photograph), and resolution information (high resolution or low resolution).

At step S2, by referring to the print mode and the image data, a print density, a printing sequence, a linefeed width, and a gradation width are set. The width of the gradation setting region is preferably an integral multiple of the linefeed width.

At step S3, a gradation type is set. Gradation types include symmetrical S-shaped gradation curves of the first embodiment illustrated in FIG. 10 that are applied to the nozzle ends, convex gradation curves of a second embodiment illustrated in FIG. 20, and linear gradation curves of a third embodiment illustrated in FIG. 21.

At step S4, a gradation repetition unit including gradation setting regions at the ends is set for each head array or each head.

Figure 14:
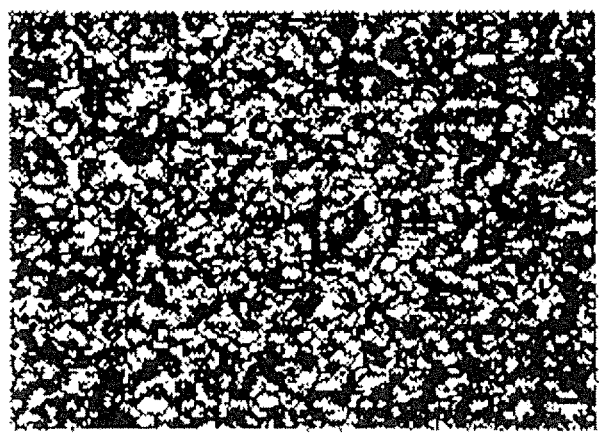
FIG. 14 is a drawing illustrating a random mask pattern that is an example of an irregular pattern according to an embodiment.

At step S5, the application range and the type of an irregular pattern are set. The irregular pattern is used to randomize the dot ratio in the gradation regions or in the entire gradation repetition unit. For example, as an irregular pattern for randomizing the dot ratio, a random pattern as illustrated in FIG. 14 may be generated based on a random function selected from multiple types of random functions, or a fixed random function may be used. Further, a random value may be set manually.

When the irregular pattern is applied not only to the setting regions to which the graduation is applied but also to the central region in the repetition unit as illustrated in FIG. 12 (c), the dot ratio of parts of the central region varied in the upward direction becomes 100%, and an average of other variations in the central region and the dot ratio of parts of the central region varied in the downward direction become less than 100%.

In the flowchart of FIG. 13, after setting the printing sequence at S2, the gradation type is set at S3, the repetition unit is set at S4, and the irregular pattern is set at S5. However, the steps may be performed in the reverse order, and steps S3 to S5 may be performed simultaneously.

At step S6, a gradation mask process is performed on the image data with the gradation curve type determined at S3 at the ends of the gradation repetition unit set at S4.

Then, at step S7, the irregular pattern set at S5 is applied to the image data on which the gradation mask process has been performed at S6, and the resulting image data is output as drive data and sent to the recording unit (head driver) 14.

The control process described above makes it possible to set gradation setting regions having a width that is an integral multiple of the linefeed width of each pass and randomize the gradation setting regions. This in turn enables overlapping passes to complement each other. Further, this configuration makes it possible to prevent density unevenness and gloss banding, and makes it possible to reduce granularity resulting from gradation.

The gradation mask setting and the control process described above may be performed at an image forming apparatus or may be performed at an information processing apparatus connected to the image forming apparatus.

Also, after the above process, an image to which an actually-set gradation mask is applied may be output onto a recording medium, the image may be detected with an optical detector (not shown), and the detection result may be fed back to the process.

<Random Mask Pattern>

A random mask pattern, which is an example of an irregular pattern of the present embodiment, is described. FIG. 14 illustrates an example of a dot formation pattern with a random mask.

In the present embodiment, for example, a dot formation pattern using a random mask as illustrated in FIG. 14 may be used in the setting of the type of an irregular pattern at step S5 and the randomization process at step S7.

In the random mask pattern, dots are arranged randomly in the main-scanning direction and the sub-scanning direction, and vacant parts are complemented by other scans.

For example, when droplets are continuously and regularly discharged from the same nozzles to print a solid image, merging of dots may occur, and the unevenness and the granularity of the image may increase. The quality of the image may be improved by using an irregular pattern such as a random mask pattern. Also, gloss unevenness can be suppressed by combining an irregular pattern with a gradation mask.

In addition, ink such as black ink with particularly-high wettability tends to cause gloss banding. However, even when forming a black solid image, gloss banding can be reduced by performing a mask process as described above.

The random mask illustrated in FIG. 14 is an example. Any random mask with a desired gap size may be selected from multiple random masks with different gap sizes by selecting a random function.

First Example of Application of First Embodiment

Figure 15:
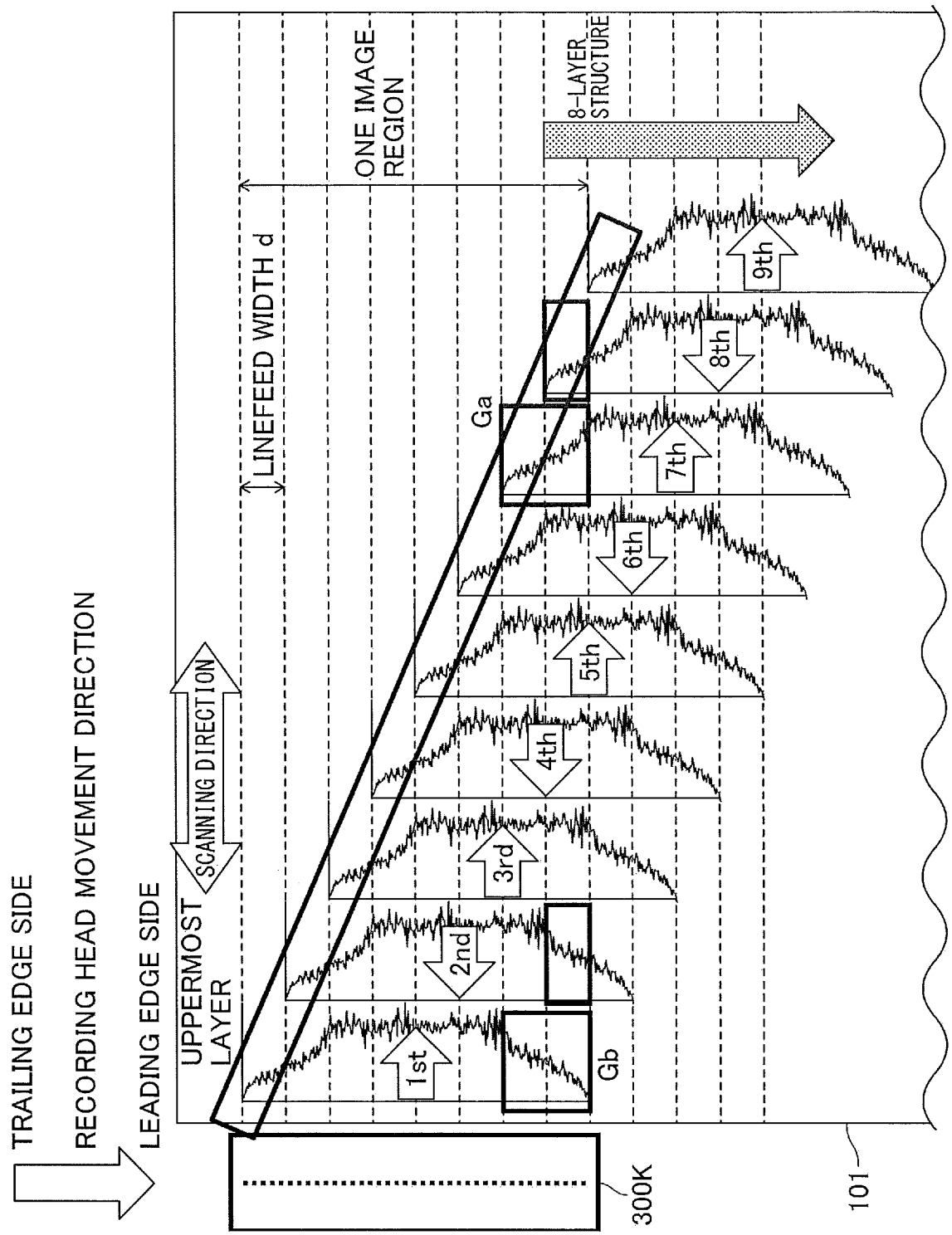
FIG. 15 is a drawing illustrating an example where a dot ratio gradation and an irregular mask according to a first embodiment are applied to a recording head unit with one head in a printing sequence where one image region is formed by eight scans in a configuration where the recording head unit moves in a sub-scanning direction.

FIG. 15 is a drawing illustrating an example where a dot ratio gradation and an irregular mask according to the first embodiment are applied to a recording head unit with one head in a printing sequence where one image region is formed by eight scans in a configuration where the recording head unit moves in the sub-scanning direction as illustrated in FIGS. 2 through 4.

In this application example, a sub-scanning movement operation indicates an operation where the recording head unit is moved in the sub-scanning direction relative to a recording medium.

When the first embodiment is applied to this configuration, gradation curves for changing the dot ratio are applied to a setting region Ga at the trailing nozzle end in the moving direction of the head 300K and a setting region Gb at the leading nozzle end in the moving direction of the head 300K.

Similarly to the example illustrated in FIG. 11, applying irregular gradation curves to the ends of the head 300K makes it possible to form layers of images such that the images formed by different scans complement each other.

Also, with the S-shaped gradation curves, because the dot ratio greatly changes in the linefeed width of the uppermost layer in the landing region, the density unevenness and the gloss unevenness at the head end can be prevented.

However, because the gradation curve illustrated in FIG. 12 (b) causes a regular gradation, the probability of the occurrence of merging of dots changes along with the continuous density change. As a result, periodic unevenness occurs, and granularity increases.

In the present embodiment, the dot ratio is randomly changed according to an irregular pattern. This makes it possible to suppress granularity.

The above configuration makes it possible to suppress density unevenness and gloss banding even in a highly-productive imaging mode by using a gradation mask in a landing region on a recording medium and also makes it possible to reduce the granularity by using an irregular pattern.

If the variation caused by the irregular pattern is too large, the original form of the gradation is lost, and the effect of suppressing density unevenness and gloss unevenness by the gradation is lost. Accordingly, the variation caused by the irregular pattern is preferably less than or equal to 50%.

Second Example of Application of First Embodiment

Figure 16:
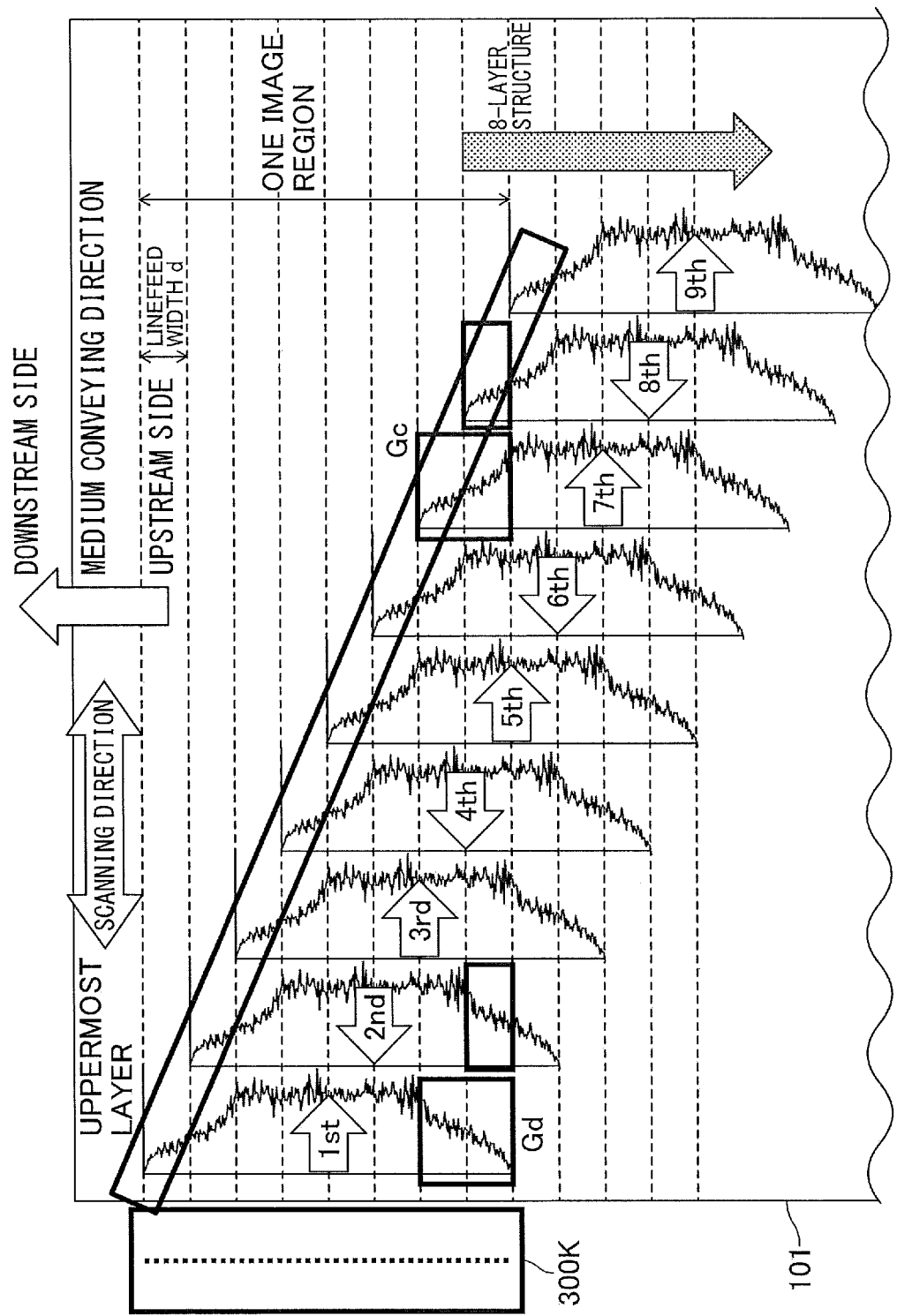
FIG. 16 is a drawing illustrating an example where a dot ratio gradation and an irregular mask according to an embodiment are applied to a recording head unit with one head in a printing sequence where one image region is formed by eight scans in a configuration where a recording medium is conveyed in the sub-scanning direction.

FIG. 16 is a drawing illustrating an example where a dot ratio gradation and an irregular mask according to the first embodiment are applied to a recording head unit with one head in a printing sequence where one image region is formed by eight scans in a configuration (configuration of the variation) where a recording medium is conveyed in the sub-scanning direction relative to the recording head unit.

In this application example, the sub-scanning movement operation is an operation in which the recording medium 101 is conveyed in the sub-scanning direction relative to the head 300K.

When the first embodiment is applied to this configuration, gradation curves for changing the dot ratio are applied to a setting region Gc at the downstream nozzle end in the conveying direction of the recording medium 101 and a setting region Gd at the upstream nozzle end in the conveying direction of the recording medium 101. Both of the gradation curves applied to the gradation regions (setting regions) Gc and Gd at the nozzle ends are S-shaped, and the setting regions have the same width.

Thus, in the present embodiment, regarding the density and gloss unevenness, the gradation regions can almost completely complement each other.

When the comparative example of FIG. 11 is applied to this configuration, because the gradation masks cause regular gradation changes, granularity may increase due to periodic unevenness and merging of dots, and the image quality may be reduced.

In the present embodiment, however, because the dot ratio changes randomly due to the irregular pattern, the probability of the occurrence of merging of dots decreases (spreads), and the image quality can be improved.

Thus, the present embodiment makes it possible to suppress density unevenness and gloss banding even in a highly-productive imaging mode by using a gradation mask in a landing region on a recording medium and also makes it possible to reduce the granularity by using an irregular pattern.

Here, when the recording head unit of each color includes one head as in FIG. 12, FIG. 15, and FIG. 16, a gradation mask is applied to the ends of the head in the sub-scanning direction.

On the other hand, when the recording head unit of each color is a head array including multiple heads arranged in the sub-scanning direction, it is possible to select whether to "perform a gradation mask process and dot ratio randomization on the ends of the head array" or "perform a gradation mask process and dot ratio randomization on the ends of each head in the head array". A case where a recording head unit includes multiple heads is described below.

<Configuration of Head Unit Including Multiple Heads>

An example where each head array includes multiple heads is described with reference to FIG. 17. FIG. 17 illustrates a second head configuration of the present embodiment where an image forming unit includes head arrays in each of which multiple heads are arranged in a staggered manner.

As illustrated in FIG. 17, an image forming unit 300a of the present embodiment includes serial head arrays. Six head arrays (recording head units) 300Ka, 300Ca, 300Ma, 300Ya, 300CLa, and 300Wa corresponding to black (K), cyan (C), magenta (M), yellow (Y), clear (CL), and white (W) are arranged from left to right in FIG. 17.

The black (K) head array 300Ka of the present embodiment includes four heads H1, H2, H3, and H4 arranged in a staggered manner in a nozzle array direction Y that is parallel to the moving direction in the sub-scanning direction Y and a conveying direction T of the recording medium 101. Each of the heads H1, H2, H3, and H4 includes multiple nozzle arrays NA arranged in the X direction.

In each of the heads H1, H2, H3, and H4, multiple nozzles for jetting droplets onto the recording medium 101 are arranged in the nozzle array direction Y (the sub-scanning direction). Each of the heads H1, H2, H3, and H4 may include one nozzle array or two or more nozzles arrays arranged in the X direction parallel to each other.

In the head array 300Ka, the heads are arranged such that the heads are in different positions in the sub-scanning direction Y (the conveying direction T) and the ends of the nozzle arrays of adjacent heads overlap each other in the nozzle array direction Y. The nozzle array direction Y is the same direction as the conveying direction.

In FIG. 17, regions where the ends of the nozzle arrays of the adjacent heads overlap each other in the nozzle array direction Y are indicated by thick dotted lines Oa, Ob, and Oc. These regions are referred to as overlapping parts Oa, Ob, and Oc.

With the configuration where the ends of the nozzle arrays of adjacent heads overlap each other in the nozzle array direction Y, the image forming unit 300a can form an image without gaps between the heads in the nozzle array direction Y of the recording medium 101. The configurations of the other head arrays 300Ca, 300Ma, 300Ya, 300CLa, and 300Wa are substantially the same as the configuration of the black (K) head array 300Ka, and therefore their descriptions are omitted here.

In the example of FIG. 17, the head array 300Ka includes four heads H1 through H4. However, the number and arrangement of heads provided in a head array are not limited to this example and may be changed as necessary. In the examples of FIG. 18 and FIG. 19 described below, it is assumed that each head array includes two or more heads arranged in the sub-scanning direction Y.

<Second Example of Gradation Repetition Unit (Head Unit Including Multiple Heads)>

Next, an example where a gradation mask process is performed on the ends of a head array including multiple heads is described.

FIG. 18 is a drawing illustrating an example where a gradation mask is applied to a head array 300Kb including two heads that is set as a gradation repetition unit.

As illustrated in FIG. 18, the head array 300Kb includes multiple heads each of which includes a nozzle array, and the heads are in different positions in the scanning direction.

The entire range of the head array 300Kb in the sub-scanning direction is set as the gradation repetition unit in the recording head unit, the gradation mask process is performed on setting regions Ga and Gb (or Gc and Gd) at the ends of the head array 300Kb in the sub-scanning direction, and dot ratio randomization is also performed.

This control method makes it possible to suppress density unevenness and gloss banding even in a highly-productive imaging mode by applying a gradation mask using a head array as a repetition unit in a landing region on a recording medium, and also makes it possible to reduce the granularity by using an irregular pattern.

<Third Example of Gradation Repetition Unit (Head Unit Including Multiple Heads)>

Next, an example where a gradation mask process is performed on each of multiple heads included in a head array is described with reference to FIG. 19.

FIG. 19 is a drawing illustrating an example in which a gradation mask is applied to each head of a head array that is set as a gradation repetition unit.

As illustrated in FIG. 19, the configuration of the head array is the same as that of FIG. 18. In this control method, the entire range in the sub-scanning direction of each of heads H1 and H2 of the head array 300Kb is set as a gradation repetition unit in the recording head unit, the gradation mask process is performed on setting regions Ga1, Gb1, Ga2, and Gb2 (or Gc1, Gd1, Gc2, and Gd2) at the ends of the heads H1 and H2 in the sub-scanning direction, and dot ratio randomization is also performed.

This control method makes it possible to suppress density unevenness and gloss banding even in a highly-productive imaging mode by applying a gradation mask using each head in a head array as a repetition unit in a landing region on a recording medium, and also makes it possible to reduce the granularity by using an irregular pattern.

In FIG. 18 and FIG. 19, the heads (or the nozzle arrays) do not overlap each other. However, the control methods described with reference to FIG. 18 and FIG. 19 may also be applied to a head array including heads (or nozzle arrays) that overlap each other as illustrated in FIG. 17.

When the control method of FIG. 19 where the gradation mask process is performed on each head of a head array is applied to a head array including overlapping heads as illustrated in FIG. 17, the overlapping width is preferably an integral multiple of the linefeed width or the linefeed width is preferably an integral multiple of the overlapping width, and the width of each of the setting regions Ga1, Gb1, Ga2, and Gb2 to which the gradation mask is applied is preferably an integral multiple of the overlapping width.

In the examples of FIGS. 17 through 19, multiple heads are arranged in each head array in a staggered manner. However, the control methods of the present embodiment may also be applied to a head array including multiple heads that are arranged in a straight line in the sub-scanning direction.

That is, the control processes of "performing a gradation mask process and dot ratio randomization on the ends of a head array" and "performing a gradation mask process and dot ratio randomization on the ends of each head in a head array" may also be performed on a head array including multiple heads arranged in a straight line.

Second Embodiment

FIG. 20 is a drawing for explaining a dot ratio according to a second embodiment.

In the second embodiment, each of gradation curves applied to gradation regions (setting regions) Ge and Gf at the nozzle ends is a convex curve that mostly represents a higher density than a straight line.

With this control method, similarly to the first embodiment, granularity can be suppressed by using an irregular pattern.

Also, because the density changes at a high level in the uppermost layer, density unevenness and gloss banding due to dot ratio gradation can also be suppressed.

However, because the gradation setting regions at the ends are not in the completely complementary relationship, a nine-layer portion may exist in addition to the eight-layer portion after the eighth scan. Therefore, the effect of preventing gloss banding becomes slightly lower. However, because an irregular pattern is applied in the present embodiment, a slight insufficiency in the complementary relationship can be compensated for.

In the example of FIG. 20, the gradation curve is a convex curve. However, the gradation curve may be a concave curve that mostly represents a lower density than a straight line. Because an irregular pattern is applied in the present embodiment, a slight insufficiency in the complementary relationship can be compensated for.

Third Embodiment

FIG. 21 is a drawing for explaining a dot ratio according to a third embodiment.

In the third embodiment, gradation curves applied to gradation regions (setting regions) Gg and Gh at the nozzle ends have a linear shape.

In the third embodiment, because the gradation curves at the nozzle ends have a linear shape, nozzles at the same distance from the ends satisfy a complementary relationship where the sum of the dot ratios of the nozzles becomes 100%. With this configuration, as illustrated in FIG. 11, the densities at the nozzles ends can complement each other in multipass interlacing.

In the third embodiment, similarly to the first embodiment, granularity can be suppressed by using an irregular pattern.

When the setting regions at the nozzle ends have the same width and are axisymmetric, the downstream-side gradation curve and the upstream-side gradation curve in the setting regions satisfy a complementary relationship where the sum of dot ratios of nozzles at the same distance from the upstream end becomes 100%. Therefore, after the eighth scan and with the eight-layer structure, the gradation curves can completely complement each other in terms of density and gloss unevenness.

In any of the embodiments, granularity, which occurs when the dot interval changes as a result of gradation, can be suppressed by applying irregular noise to at least a portion where the dot ratio varies or to the entire region of the gradation repetition unit.

In the examples of FIG. 20 and FIG. 21, the dot ratio is adjusted in a configuration where a recording head unit includes one head. However, the control methods of the second and third embodiments using a combination of a gradation mask and irregular noise may also be applied to a configuration where a recording head unit includes multiple heads. For example, the dot ratio control methods of the second and third embodiments may be applied to a gradation repetition unit that is the entire head array including two heads as illustrated in FIG. 18. Also, the dot ratio control method of the second embodiment may be applied to a gradation repetition unit that is each of the two heads included in a head array as illustrated in FIG. 19.

A liquid jetting apparatus and a jetting control method according to the embodiments of the present invention are described above. However, the present invention is not limited to the specifically disclosed embodiments, and variations and modifications may be made without departing from the scope of the present invention.

What is claimed is:

1. A liquid jetting apparatus, comprising:
   a recording head unit including a head array that includes
      a plurality of nozzle arrays
      each nozzle array being formed of multiple nozzles and configured to discharge a liquid toward a recording medium, and
      each nozzle array and the head array being arranged in a sub-scanning direction;
   a moving mechanism configured to alternately perform
      a scanning operation of moving the recording head unit relative to the recording medium in a scanning direction orthogonal to the sub-scanning direction while causing the head array to discharge the liquid toward the recording medium, and a sub-scanning movement operation of moving one of the recording head unit and the recording medium relative to another one of the recording head unit and the recording medium in the sub-scanning direction without causing the head array to discharge the liquid;

a gradation setting unit configured to apply gradation on portions of image data corresponding to setting regions at both ends of the head array in the sub-scanning direction such that a number of dots discharged from the nozzles decreases toward each end of said both ends;

an irregular pattern setting unit configured to set an irregular pattern on the image data to randomize a dot ratio indicating the number of dots per unit area; and a head discharge drive unit configured to cause the nozzles of the head array to discharge the liquid during the scanning operation based on the image data on which the gradation and the irregular pattern are set.

2. The liquid jetting apparatus as claimed in claim 1, wherein the irregular pattern setting unit is configured to randomize the dot ratio only in the setting regions at the ends of the head array.

3. The liquid jetting apparatus as claimed in claim 1, wherein an entire range of the head array in the sub-scanning direction is set as a gradation repetition unit.

4. The liquid jetting apparatus as claimed in claim 1, wherein an entire range in the sub-scanning direction of a first nozzle array and of a second nozzle array of the plurality of nozzle arrays is set as a gradation repetition unit.

5. The liquid jetting apparatus as claimed in claim 1, comprising:
a plurality of recording head units, wherein
both ends of each nozzle array of the plurality of nozzle arrays in adjacent recording head units overlap each other in the nozzle array direction.

6. The liquid jetting apparatus as claimed in claim 1, wherein the gradation repetition setting unit assigns a gradation pattern to either of the head array, or each nozzle array of the plurality of nozzle arrays.

7. The liquid jetting apparatus as claimed in claim 1, wherein the gradation applied to the setting regions at said both ends of the head array is applied as a convex curve.

8. The liquid jetting apparatus as claimed in claim 1 further comprising:
a UV light source provided to a side of the recording head unit in a scanning direction orthogonal to the sub-scanning direction, wherein
the liquid discharged by the nozzles of the recording head unit onto the recording medium is irradiated with UV light emitted from the UV light source after a predetermined time has elapsed after the discharge of the liquid onto the recording medium.

9. The liquid jetting apparatus as claimed in claim 8, wherein the irregular pattern setting unit is configured to randomize the dot ratio only in the setting regions at the ends of the recording head unit.

10. The liquid jetting apparatus as claimed in claim 8, wherein the liquid discharged by the recording head unit onto the recording medium is a UV-curable ink.

11. The liquid jetting apparatus as claimed in claim 10, wherein the UV-curable ink includes a methacrylate monomer.

12. A method performed by a liquid jetting apparatus that includes
a recording head unit including a head array that includes
a plurality of nozzle arrays
each nozzle array being formed of multiple nozzles and configured to discharge a liquid toward a recording medium, and
each nozzle array and the head array being arranged in a sub-scanning direction; and
a moving mechanism configured to alternately perform
a scanning operation of moving the recording head unit relative to the recording medium in a scanning direction orthogonal to the sub-scanning direction while causing the head array to discharge the liquid toward the recording medium, and
a sub-scanning movement operation of moving one of the recording head unit and the recording medium relative to another one of the recording head unit and the recording medium in the sub-scanning direction without causing the head array to discharge the liquid,
the method comprising:
setting gradation on portions of image data corresponding to setting regions at both ends of the head array in the sub-scanning direction such that a number of dots discharged from the nozzles decreases toward each end of said both ends;
setting an irregular pattern on the image data to randomize a dot ratio indicating the number of dots per unit area; and
causing the nozzles of the head array to discharge the liquid during the scanning operation based on the image data on which the gradation and the irregular pattern are set.

13. The method as claimed in claim 12, wherein
the liquid jetting apparatus further includes:
a UV light source provided to a side of the recording head unit in a scanning direction orthogonal to the sub-scanning direction, and
the method further comprises:
irradiating the liquid discharged onto the recording medium by the nozzles of the recording head unit with UV light emitted from the UV light source after a predetermined time has elapsed after the discharge of the liquid onto the recording medium.

* * * * *